(12) United States Patent
Murokita et al.

(10) Patent No.: US 8,912,928 B2
(45) Date of Patent: Dec. 16, 2014

(54) ENCODER, DRIVING APPARATUS, METHOD FOR CALCULATING ABSOLUTE POSITION, AND METHOD FOR MANUFACTURING ENCODER

(71) Applicant: Kabushiki Kaisha Yaskawa Denki, Kitakyushu-shi (JP)

(72) Inventors: Ikuma Murokita, Kitakyushu (JP); Yasushi Yoshida, Kitakyushu (JP); Jiro Muraoka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 257 days.

(21) Appl. No.: 13/629,606

(22) Filed: Sep. 28, 2012

(65) Prior Publication Data

US 2013/0020917 A1 Jan. 24, 2013

Related U.S. Application Data

(63) Continuation of application No. PCT/JP2011/051108, filed on Jan. 21, 2011.

(30) Foreign Application Priority Data

Apr. 2, 2010 (JP) ................. 2010-085800

(51) Int. Cl.
*H03M 1/22* (2006.01)
*G01D 5/244* (2006.01)

(52) U.S. Cl.
CPC .................. *G01D 5/2449* (2013.01)
USPC .................................. 341/9; 341/1

(58) Field of Classification Search
CPC ................................... G01D 5/2449
USPC ....................................... 341/1, 9
See application file for complete search history.

(56) References Cited

U.S. PATENT DOCUMENTS 6,384,752 B1 5/2002 Suzuki et al.
6,772,078 B2 8/2004 Uehira
(Continued)

FOREIGN PATENT DOCUMENTS

CN 1319176 10/2001
CN 1702433 11/2005
(Continued)

OTHER PUBLICATIONS

International Search Report for corresponding International Application No. PCT/JP2011/051108, Jul. 12, 2011.
(Continued)

*Primary Examiner* — Peguy Jean Pierre
(74) *Attorney, Agent, or Firm* — Mori & Ward, LLP

(57) ABSTRACT

An encoder includes a position data obtainer that obtains superordinate data representing a position of a moving body in a superordinate section and subordinate data representing a position in a subordinate section repeated in a superordinate section with higher resolution than that of the superordinate data, a storage in which a correction value that can correct a deviation amount occurring in the superordinate data against the subordinate data is recorded to be associated with an absolute position with resolution nearly equal to that of the superordinate data, a corrector that obtains the correction value from the storage and corrects the superordinate data, and a section identifier that identifies, based on the superordinate data corrected by the corrector and the subordinate data when the superordinate data is obtained, the subordinate section in which the subordinate data is obtained against the superordinate section.

10 Claims, 11 Drawing Sheets

(56) References Cited

U.S. PATENT DOCUMENTS

| | | | |
|---|---|---|---|
| 6,956,505 B2 | 10/2005 | Taniguchi et al. | |
| 2010/0034400 A1* | 2/2010 | Aiso | 381/119 |

FOREIGN PATENT DOCUMENTS

| | | |
|---|---|---|
| CN | 1975336 | 6/2007 |
| CN | 101371105 | 2/2009 |
| EP | 0369031 B1 | 9/1993 |
| JP | 59-225316 | 12/1984 |
| JP | 3336396 B | 10/1995 |
| JP | 2003-121135 | 4/2003 |
| JP | 3551252 B | 8/2004 |
| JP | 3772121 B2 | 5/2006 |
| JP | 2010-025879 | 2/2010 |
| TW | 200732630 | 9/2007 |

OTHER PUBLICATIONS

Written Opinion for corresponding International Application No. PCT/JP2011/051108, Jul. 12, 2011.

Chinese Office Action for corresponding CN Application No. 201180016560.0, May 23, 2014.

Extended European Search Report for corresponding EP Application No. 11765259.4-1558, Sep. 19, 2014.

\* cited by examiner

ENCODER, DRIVING APPARATUS, METHOD FOR CALCULATING ABSOLUTE POSITION, AND METHOD FOR MANUFACTURING ENCODER

CROSS-REFERENCE TO RELATED APPLICATIONS

This application is a continuation of PCT international application Ser. No. PCT/JP2011/051108 filed on Jan. 21, 2011 which designates the United States, and which claims the benefit of priority from Japanese Patent Application No. 2010-085800, filed on Apr. 2, 2010; the entire contents of which are incorporated herein by reference.

FIELD

The present invention relates to an encoder, a driving apparatus, a method for calculating an absolute position, and a method for manufacturing an encoder.

BACKGROUND

An encoder is used for identifying the position of a moving body. Along with improved operation accuracy of servomotors and the like, endeavor has been made to improve position identifying accuracy of an encoder. An example of methods for improving position identifying accuracy is a method of identifying a position by using a so-called "accumulation method".

According to the accumulation method, a position of a moving body is represented by using a plurality of position data having different resolutions. By identifying positions of the moving body sequentially from the position data with low resolution (superordinate data) to the position data with high resolution (subordinate data), position data representing an accurate absolute position of the moving body are generated. According to the accumulation method, for example, by including the absolute position data of the moving body into the position data with the lowest resolution, the absolute position with high resolution can be also identified.

However, according to the accumulation method, if an error (also referred to as a "phase error") occurs between two or more pieces of position data having different resolutions, the position data obtained by accumulating the two or more pieces of position data may become inaccurate.

In order to generate accurate position data even when such an error occurs, an encoder described in Japanese Patent No. 3551252 or Japanese Patent No. 3336396, for example, has been developed. According to the encoder, despite in a different manner, by using subordinate data and superordinate data in a process of generating position data, a section in the superordinate data in which the subordinate data are obtained is identified to generate the position data representing an absolute position from the section identified and the subordinate data. Therefore, compared with an example in which data are simply accumulated, by compensating the phase error described above when identifying the section, more accurate position data are generated.

According to the encoder described in Japanese Patent No. 3551252 or Japanese Patent No. 3336396, the phase error is corrected in the process of generating position data based on two or more pieces of position data having different resolutions. However, a deviation amount that can be corrected is limited. Although such a limited amount may depend on a correction method or resolutions of various position data, even when the limited amount is the maximum amount, for example, if the position data with lower resolution exceeds a half of a phase of the position data with higher resolution, the phase error can be hardly corrected.

One of the causes of the phase error is, for example, an error included in a detection signal used in generating the position data. The phase errors are broadly classified into non-reproducible errors and reproducible errors in accordance with characteristics of the error included in the detection signal. The non-reproducible error is caused by real-time driving conditions such as transfer of a moving body or vibration. The reproducible error is caused by a detection mechanism itself such as a manufacturing error. Therefore, according to the encoder described in Japanese Patent No. 3551252 or Japanese Patent No. 3336396, for example, if a non-reproducible error depending on real-time driving conditions is accumulated on the reproducible error included in the encoder itself originally, for example, reality is that the limited amount of correction is exceeded.

SUMMERY

An encoder according to an embodiment includes a position data obtainer, a storage, a corrector, a section identifier. The position data obtainer configured to obtain superordinate data representing a position of a moving body in a superordinate section in which the moving body is capable of moving and subordinate data representing a position of the moving body in a subordinate section repeated in the superordinate section with higher resolution than that of the superordinate data. The storage in which a correction value capable of correcting a deviation amount generated in advance, based on the deviation amount occurring in the superordinate data against the subordinate data and measured in advance, is recorded to be associated with an absolute position with lower resolution than that of the subordinate data of the moving body. The corrector configured to obtain, based on an absolute position with the low resolution when the superordinate data is obtained by the position data obtainer, a correction value associated with the absolute position from the storage and to correct the superordinate data based on the correction value. The section identifier configured to identify, based on the superordinate data corrected by the corrector and the subordinate data when the superordinate data is obtained, the subordinate section in which the subordinate data is obtained against the superordinate section.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

With reference to the accompanying drawings, embodiments of the present invention will be described in detail hereinafter. In this specification and the drawings, elements having substantially the same functions are represented with the same numerals to avoid overlapped explanation of the elements as necessary.

In order for an embodiment of the present invention to be easily understood, description will be made in the following order for convenience of description.
<1. An Encoder According to the Embodiment of the Present Invention and the Like.>
  (1-1. The structure of a driving apparatus)
  (1-2. A multiplication accumulation method and errors of the encoder)
    (1-2-1. The multiplication accumulation method)
    (1-2-2. Errors of the encoder)
  (1-3. The structure of the encoder)
  (1-4. Operations of the encoder)
  (1-5. Examples of error corrections by the encoder)
    (1-5-1. Examples of a first error correction)
    (1-5-2. Examples of a second error correction)
  (1-6. Examples of effects of the embodiment of the present invention)
<2. Manufacturing the Encoder According to the Embodiment of the Present Invention>
  (2-1. The structure of the manufacturing apparatus for the encoder)
  (2-2. Operations of the manufacturing apparatus for the encoder)
<1. An encoder according to the embodiment of the present invention and the like.>
  (1-1. The Structure of a Driving Apparatus)

Figure 1:
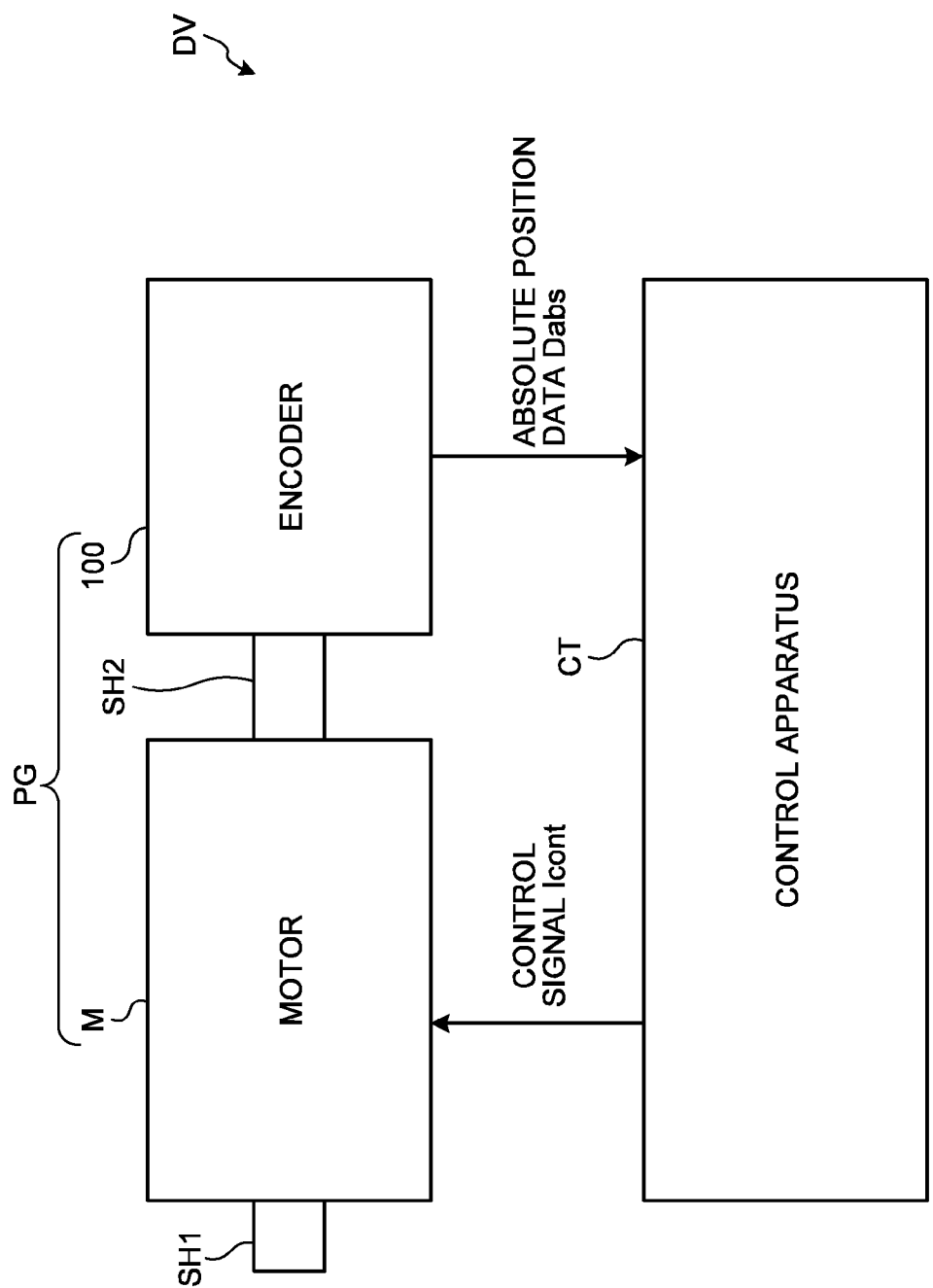
FIG. 1 is a schematic diagram for illustrating a driving apparatus according to an embodiment of the present invention.

The structure of a driving apparatus according to an embodiment of the present invention will be described with reference to FIG. 1. FIG. 1 is a schematic diagram for illustrating the driving apparatus according to the embodiment of the present invention.

As illustrated in FIG. 1, a driving apparatus DV according to the embodiment of the present invention has a power generation apparatus PG and a control apparatus CT. The power generation apparatus PG has a motor M and an encoder 100.

The motor M is an example of a power generation source not including the encoder 100 and drives a subject (not illustrated) to be driven by the driving apparatus DV using the power generated. On this occasion, the motor M is controlled by the control apparatus CT based on absolute position data that is output from the encoder 100.

Operation principles or types of the motor M are not limited to specific ones.

That is to say, the motor M is not limited to an electrically operated motor unit in which electricity is used as a power source. For example, the motor M may be other motors such as a hydraulic motor unit, a pneumatic motor unit, or a steam motor unit in which any other power source is used. The motor M may be, for example, a rotary motor that rotates a subject to be driven, or, a linear motor that moves a subject to be driven along a line such as a straight line or a curved line.

However, an example in which the motor M is a rotary electrically operated motor is described below for convenience of description. Specifically, the motor M according to the embodiment of the present invention has a rotor shaft SH1 at one side of the motor M at least. The motor M rotates the rotor shaft SH1 around its rotation axis to output rotation force. On this occasion, the motor M according to the embodiment of the present invention obtains electrical signals (e.g., applied voltage or current to the motor M) as control signals Icont from the control apparatus CT to rotate the rotor shaft SH1 in accordance with the electrical signals.

When the embodiment of the present invention is applied to a motor M having a different operation principle or of a different type, the differences will be described supplementarily as necessary.

In the embodiment of the present invention, the encoder 100 is coupled to an another rotor shaft SH2 rotating in response to the rotor shaft SH1 and arranged at the opposite side of the rotor shaft SH1 on the output side of the motor M. The encoder 100 detects an absolute position (e.g., a rotation angle) of the rotor shaft SH2 to detect an absolute position of the rotor shaft SH1 to which rotation force is output and/or an absolute position of a subject to be driven (not illustrated) connected to the rotor shaft SH1. Additionally, the encoder 100 outputs absolute position data representing the absolute position detected to the control apparatus CT.

The encoder 100 can output a highly accurate absolute position as absolute position data using an "accumulation method" involving so-called "multiplication processing" to detect absolute positions with high resolution and high accuracy (hereinafter, referred to as a "multiplication accumulation method"). The "multiplication accumulation method" will be described in detail later.

The encoder 100 may detect the absolute position using the multiplication accumulation method as needed. The encoder 100 may also detect the absolute position using the multiplication accumulation method only when a predetermined operation is started, such as when the power is turned on or when an error occurs in the driving apparatus DV. In this case, the encoder 100 detects the absolute position using the multiplication accumulation method when, for example, an absolute position request signal (not illustrated) is received from an external (e.g., the control apparatus CT), when the power of the encoder 100 is turned on, or when the motor M performs a predetermined operation. After detecting the absolute position using the multiplication accumulation method, the encoder 100 can detect the absolute position by, for example, counting up the detection signals with the highest resolution. In the embodiment of the present invention, an example in which the absolute position is detected using the multiplication accumulation method is described below in detail for convenience of description.

The encoder 100 may detect at least one of rotational speed (also referred to as angular velocity) and rotational acceleration (also referred to as angular acceleration) of the rotor shaft SH2 and the like, in addition to the absolute position of the rotor shaft SH2 and the like. In this case, angular velocity and angular acceleration can be detected by the encoder 100 through processing of differentiating the absolute position once or twice with time, or processing of measuring (e.g., counting) a change amount of the absolute position per unit time or an change amount of the change amount per unit time.

The absolute position detected by the encoder 100 may be any absolute positions depending on which one of absolute positions of the rotor shaft SH2, the rotor shaft SH1 and a subject to be driven (not illustrated) is used for the driving apparatus DV to drive the rotor shaft SH2, the rotor shaft SH1, or the subject to be driven. Therefore, the subject of which absolute position is detected will be an example of a moving body. In the embodiment of the present invention, an example in which the absolute position of the rotor shaft SH2 is detected by the encoder 100 is described below for convenience of description.

The arranged position of the encoder 100 is not limited to that of the embodiment of the present invention. The encoder 100 may be arranged, for example, so as to be directly coupled to the rotor shaft SH1 to which power is output, or coupled to a rotor such as a rotor shaft through other mechanisms such as a speed reducer or a rotation direction changer depending on the source of the absolute position that is used for the driving apparatus DV or the arrangement of the apparatus itself.

The control apparatus CT obtains absolute position data that is output by the encoder 100 to control the power generation state of the power generation apparatus PG, that is, rotation of the motor M based on the absolute position represented with the absolute position data. Therefore, in the embodiment of the present invention in which an electrically operated motor unit is used as the motor M, the control apparatus CT controls the current or voltage applied to the motor M as control signals Icont based on the absolute position data, thereby controlling the rotation of the motor M. When other power sources are used for the motor M, which is, for example, a hydraulic motor, a pneumatic motor, or a steam motor, the control apparatus CT can control the rotation of the motor M by controlling supply of the power source used.

It is to be understood that the control apparatus CT can also obtain superordinate control signals from a superordinate control apparatus (not illustrated), thereby controlling the motor M so that the positions or the like represented with the superordinate control signals are output from the rotation axis of the motor M.

(1-2. A multiplication Accumulation Method and Errors of the Encoder)

As described above, the driving apparatus DV rotates the motor M in accordance with the absolute position detected by the encoder 100 and drives a subject to be driven. Therefore, if any error is included in the absolute position detected by the encoder 100, driving accuracy of a subject driven by the driving apparatus DV itself may be significantly affected. In this respect, the encoder 100 according to the embodiment of the present invention corrects errors generated in a position detection mechanism of the encoder 100 with a highly broad tolerance so as to be able to detect a highly accurate absolute position, in addition to adopting the multiplication accumulation method. The encoder 100 according to the embodiment of the present invention will be described below in detail.

Before describing the encoder 100 in detail, in order for particular operations and effects of the encoder 100 to be understood easily, errors that may occur in the multiplication accumulation method used by the encoder 100 according to the embodiment of the present invention or in the encoder will now be described.

(1-2-1. The Multiplication Accumulation Method)

Encoders are broadly classified into an absolute encoder and an incremental encoder, for example, depending on which positional information they detect.

An absolute encoder detects a detection signal uniquely representing an absolute position within one rotation of the rotor shaft SH2 (an example of movable range of a moving body or a superordinate section) and calculates the absolute position of the rotor shaft SH2 based on the detection signal. Therefore, the absolute encoder can finalize the absolute position immediately after the power is turned on. That is to say, the absolute encoder can calculate the absolute position with high resolution, by having the absolute position as an initial value and thereafter through processing such as counting the detection signals (incremental signals) uniquely representing positions in sections repeated within one rotation of the rotor shaft SH2 (an example of a superordinate section and a subordinate section, also referred to as a pitch).

In contrast, the incremental encoder cannot identify the absolute position because the position data becomes 0 when the power is turned on. That is to say, after the power is turned on and the position data becomes 0, the incremental encoder calculates relative positions by detecting detection signals uniquely representing positions in sections repeated within one rotation of the rotor shaft SH2 and thereafter through processing of counting the detection signals having occurred from the predetermined origin position. In other words, in the incremental encoder, an origin signal, for example, separately provided one for one rotation is used. The incremental encoder adds a relative correction amount obtained when the detection signal passes the origin signal, whereby the absolute position is calculated temporarily.

The detection signal detected by the absolute encoder is also referred to as "abso-signal" or "1X signal", while the detection signal detected by the incremental encoder is also referred to as "incre-signal", "incre-signal multiplied by n" depending on the division number n, or "nX signal". The abso-signal and incre-signal respectively have a periodic signal having one period for one rotation (movable range) or for one section (a divided section). The abso-signal having one period for one rotation can also be referred to as a periodic signal having one period in a section dividing movable range (one rotation) by one (i.e., one rotation).

From the abso-signal or the incre-signal, the detection signal is converted from analog to digital, which is in turn converted into a phase angle in the period, whereby a position in one section (including a position in one rotation (an absolute position), also referred to as a position in a section) is calculated. The position in one section (an angle) is also referred to as an "electrical angle". This means that a position in one period is represented with an angle ranged from 0° to 360°. After converting each of periodical detection signals from analog to digital and before converting them to position data, for example, the absolute encoder and the incremental encoder perform multiplication processing (here multiplication number is m) to improve the resolution of the detection signals m times to be able to improve detection accuracy of a position in one section.

More specific examples of the multiplication accumulation method will be described. The encoder 100 according to the embodiment of the present invention obtains one abso-signal and one or more incre-signals, for example, substantively at the same time. The encoder 100 measures an absolute position with resolution of the incre-signal based on the abso-signal and the incre-signal. This processing by the encoder 100 can be conceptually described as below. After performing multiplication processing, for example, on the detection signals to improve the resolution, the encoder 100 calculates the absolute position from the lowest resolution abso-signal, while calculating a position in a section corresponding to the resolution of the incre-signal from the incre-signals. Then, the encoder 100 superposes (accumulates) the positions in the section represented by incre-signals in ascending order of resolution onto the absolute position with the lowest resolution to identify the absolute position with the resolution of incre-signal with the highest resolution. An absolute position detection method as described above that realizes high resolution is referred to as a "multiplication accumulation method". This means that after the detection signal is multiplied, position data obtained by the detection signals having different resolutions are superposed (accumulated). Although only accumulating without multiplication processing is possible, the multiplication accumulation method will be described in the embodiment of the present invention.

Here, a method for accumulating positions in sections having different resolutions and division numbers in a movable range (one rotation or one section) will be conceptually and specifically described as below. For example, first position data representing the absolute position obtained from the abso-signal, second position data representing positions obtained from the incre-signal having subsequent higher resolution after the first position data, and third position data representing positions obtained from the incre-signal having subsequent higher resolution after the second position data will now be described. In the accumulation method, based on the first position data and the second position data, it is identified that which one of a plurality of second sections included in the absolute position represented by the first position data is the second section in which a position is represented by the second position. Sequentially, based on the second position data and the third position data, it is identified which one of a plurality of the third sections included in the absolute position represented by the second position data is the third section in which a position is represented by the third position. As a result, after the two sections identified are superposed, the position in the third section with the highest resolution is further superposed thereon, whereby the absolute position with the resolution of the third position data can be calculated. Although various methods of section identification processing are possible, the following method is used at least in a relative relationship of resolutions: from two pieces of position data (an example of superordinate data and subordinate data) that have a relationship of superordinate (resolution is low) and subordinate (resolution is high), a section (an example of subordinate section) from which subordinate position data is obtained, is identified against a section of the superordinate position data (an example of superordinate section).

(1-2-2. Errors of the Encoder)

A detection error may occur in the detection signals of the individual resolutions, for example. If a detection error occurs, during the processing using the multiplication accumulation method as described above, when identifying a section, a wrong section may be identified. That is to say, when identifying a subordinate section, if a deviation amount occurs in superordinate position data with lower resolution against subordinate position data with higher resolution, an error occurs in a synchronized state between the both position data. Accordingly, a wrong subordinate section may be identified depending on a synchronization deviation amount. Causes of such a deviation amount are broadly classified into an error that can be reproduced (also referred to as a "reproducible error") and an error that cannot be reproduced (also referred to as a "non-reproducible error"). The reproducible error attributes mainly to errors included in an apparatus or a unit itself, such as a detection mechanism of the detection signal or apparatuses or units included in the encoder 100. On the other hand, the non-reproducible error attributes mainly to noises changing in real time such as vibrations or stray lights while the detection signals are being obtained. With the section identification processing, the deviation amount described above can be corrected to some extent and an accurate section can be identified. However, if the synchronization deviation in the superordinate position data against the subordinate position data reaches about a half of the section of the subordinate position data, an accurate section can be hardly identified from the combination of the superordinate position data and the subordinate position data. In this respect, the encoder 100 according to the embodiment of the present invention can correct the deviation amount appropriately, even when the synchronization deviation in the superordinate position data against the subordinate position data reaches about a half of the section of the subordinate position data as described above and can identify the correct section of the subordinate position data. Therefore, the encoder 100 can calculate the absolute position with accuracy and high resolution.

Hereinafter, the encoder 100 according to the embodiment of the present invention will be described in detail with reference to FIG. 2.

Some example are described below for convenience of description, in which, similar to the example above, the encoder 100 obtains three pieces of position data having different resolutions (the first position data including an absolute position to the third position data) to calculate the absolute position with the resolution of the position data with the highest resolution using the multiplication accumulation method. It should be noted that these are only examples. The encoder 100 can also obtain two pieces of position data or three or more pieces of position data having different resolutions to calculate the absolute position. Even in this case, in a plurality of position data obtained by the encoder 100 and used for calculating the absolute position, position data representing the absolute position with the lower resolution at least than other position data (e.g., position data with the lowest resolution) is included.

The first position data d1 has the lowest resolution out of the three pieces of position data and represents the absolute position in one rotation (an example of movable range or a superordinate section, also referred to as a first section T1) of the rotor shaft SH2 (hereinafter, referred to as a "first position p1" or a "reference position Dorg"). The first position data d1 is also referred to as a reference absolute position data.

The second position data d2 has subsequent higher resolution after the first position data d1 and represents a position in a section in the second section T2 (an example of a superordinate section or a subordinate section), which is obtained by dividing one rotation by a second division number n2 (e.g., n2=4) that is equal to or larger than two, and which is repeated n2 times in one rotation (hereinafter, also referred to as a "second position p2").

The third position data d3 has the highest resolution out of the three pieces of position data and represents a position in a section in a third section T3 (an example of a subordinate section), which is obtained by dividing the second section T2 by a third division number n3 (e.g., n3=4) that is equal to or larger than two, and which is repeated n3 times in the second section (hereinafter, also referred to as a "third position p3").

The first position data has the lowest resolution as described above and can also be represented as a position data (also referred to as "reference absolute position data Dorg") representing a position (also referred to as a "reference position") in the first section T1 dividing the movable range (one rotation) by the first division number n1 (n1=1).

In a relative relationship of resolution, out of two pieces of position data adjacent to each other in respect to resolution height, the position data with higher resolution is also referred to as "subordinate data" and the position data with lower resolution is also referred to as "superordinate data". In this case, a section represented by a position in a section of the subordinate data is also referred to as a "subordinate section"

and a section represented by a position in a section of the subordinate data is also referred to as a "superordinate section".

More specifically, for example, in respect to the first position data d1 and the second position data d2, the first position data d1 is superordinate data and the second position data d2 is subordinate data. Then, the first section T1 (movable range) of which position is represented by the first position data d1 is the superordinate section and the second section T2 of which position is represented by the second position data d2 is the subordinate section. For another example, in respect to the second position data d2 and the third position data d3, the second position data d2 is superordinate data and the third position data d3 is subordinate data. Then, the second section T2 of which position is represented by second position data d2 is the superordinate section and the third section T3 of which position is represented by the third position data d3 is the subordinate section. It is to be understood that the third position data d3 having the highest resolution is not to be superordinate data and the first position data d1 having the lowest resolution is not to be subordinate data due to the relative relationship of resolution.

(1-3. The Structure of the Encoder)

Figure 2:
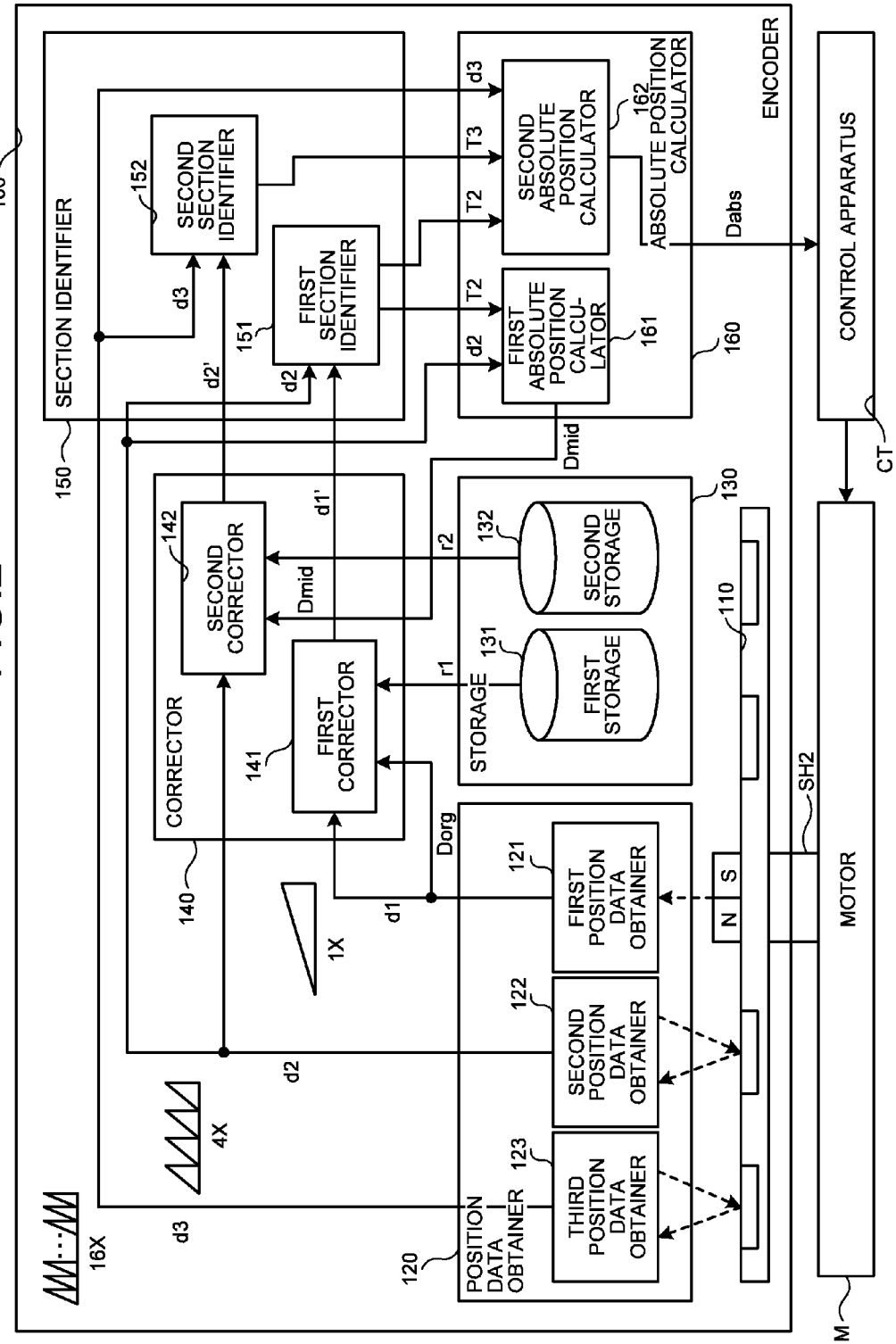
FIG. 2 is a schematic diagram for illustrating an encoder according to the embodiment of the present invention.

FIG. 2 is a schematic diagram for illustrating the encoder according to the embodiment of the present invention.

As illustrated in FIG. 2, the encoder 100 has mainly a disc 110, a position data obtainer 120, a storage 130, a corrector 140, a section identifier 150, and an absolute position calculator 160. The position data obtainer 120 is an example of a means for obtaining. The storage 130 is an example of a means for storing. The corrector 140 is an example of a means for correcting. The section identifier 150 is an example of a means for identifying.

The disc 110 is connected to the rotor shaft SH2 and rotates along with rotation of the rotor shaft SH2. In the disc 110, a first detection mechanism to a third detection mechanism are provided so that the following three detection signals are obtained: a detection signal of an n1 period for one rotation (n1=1), a detection signal of an n2 period for one rotation (e.g., n2=4), and a detection signal of an n2×n3 period for one rotation (e.g., n3=4) (hereinafter, also referred to as "1X signal, 4X signal, 16X signal").

The first detection mechanism to the third detection mechanism are not limited to specific ones as long as they are detection mechanisms that can obtain detection signals for each of the periods. For example, in the embodiment of the present invention, a magnet of which poles are aligned in a plane parallel to the disc 110, which is arranged in the rotational center of the disc 110 is used for the first detection mechanism. On the disc 110, tracks with a plurality of slits each of which is corresponding to the second detection mechanism and the third detection mechanism are formed through optical detection principles. For a track in the second detection mechanism, slits of the number of n2 are formed so that detection signals for n2 periods in one rotation are obtained by dividing one rotation by the division number n2. In the embodiment of the present invention, although an example in which n2=4 is described, in practice, setting n2 to a value larger than four is preferred. For a track in the third detection mechanism, slits of the number of n2×n3 are formed so that detection signals for n2×n3 periods in one rotation are obtained by dividing one rotation by a division number n2×n3. As described above, it should be noted that the first detection mechanism to the third detection mechanism are only examples and the embodiment of the present invention is not limited to the examples of the detection mechanisms.

The position data obtainer 120 obtains three pieces of position data (the first position data d1 to the third position data d3) of resolution (e.g., 1:n2:n2×n3=1:4:16) in the respective detection mechanisms from the first detection mechanism to the third detection mechanism included in the disc 110. Specifically, the position data obtainer 120 has a first position data obtainer 121 to a third position data obtainer 123, each of which obtains the first position data d1 to the third position data d3, respectively. The first position data obtainer 121 to the third position data obtainer 123 obtain the first position data d1 to the third position data d3 having different resolutions from the corresponding, first to third detection mechanism through the detection principles.

Here, position data obtainment by the first position data obtainer 121 to the third position data obtainer 123 is described by illustrating the third position data obtainer 123. The third position data obtainer 123 irradiates the track of third detection mechanism of the disc 110 with light to detect reflected light from a plurality of slits formed in the track. Then, in the embodiment of the present invention, the detection signal becomes a substantially sine-wave signal repeated the number of periods depending on the number of the slits (i.e., the division number n2×n3) in one rotation. Therefore, after analog-digital converting and multiplying the sine-wave detection signal by m3, the third position data obtainer 123 converts the sine-wave detection signal into the electrical angle to obtain the third position data d3 representing the third position p3 in the third section T3. The first position data obtainer 121 and the second position data obtainer 122, similar to the third position data obtainer 123 even though having a different detection mechanism or resolution, respectively obtain the first position data d1 representing the first position p1 in the first section T1 (one rotation), and, the second position data d2 representing the second position p2 in the second section T2.

It is to be understood that the encoder 100 according to the embodiment of the present invention is not limited to specific ones nor the examples described here, in respect of a position data obtainment mechanism, e.g., the detection mechanism of the detection signal, or a change direction from the detection signal to the position data.

In the storage 130, a correction value used when the superordinate data is corrected against the subordinate data in the corrector 140 described later is recorded to be associated with the absolute position of the rotor shaft SH2 with lower resolution than that of the subordinate data when the superordinate data is obtained. In the embodiment of the present invention, the absolute position having resolution nearly equal to that of the superordinate data to be corrected is used as an absolute position having low resolution with which the correction value is associated.

In the embodiment of the present invention, two types of correction values r1, r2 are used. The corrector 140 described later corrects the deviation of the superordinate data against the subordinate data in respect to pairs of two pieces of position data in the relationship of the superordinate data and the subordinate data in the relative relationship of resolution. Therefore, the encoder 100 according to the embodiment of the present invention corrects the deviation amount occurring in the first position data d1 against the second position data d2 in a first pair, the deviation occurring in the second position data d2 against the third position data d3 in a second pair. Therefore, the correction value r1 is recorded in the storage 130 as a correction value that corrects the deviation of the second position data d1, and, the correction value r2 is recorded in the storage 130 as a correction value that corrects the deviation of the first position data d2. If the encoder 100 calculates the absolute position from two pieces of position data, only one pair is formed, so one type of correction value is to be recorded in the storage 130. On the other hand, if the encoder 100 calculates the absolute position from position data of the number of j that is equal to or larger than three, pairs of the number of j−1 are formed, so correction values of types of the number of j−1 are recorded in the storage 130. In the embodiment of the present invention, in order to distinguish the storages storing the two types of the correction values r1, r2 used in the embodiment of the present invention from each other, the storage 130 has a first storage 131 in which the correction value r1 is recorded and a second storage 132 in which the correction value r2 is recorded.

The correction values r1, r2 are, as described above, the absolute positions with lower resolution than that of the subordinate data in the pair to be corrected and recorded in the first storage 131 and the second storage 132 respectively, associated with the absolute positions when the superordinate data to be corrected is obtained. Here, in the embodiment of the present invention, the absolute positions having resolution nearly equal to that of superordinate data with lower resolution than that of the subordinate data are used as the absolute positions with which the correction values r1, r2 are associated. That is to say, the correction value r1 is associated with the absolute position having resolution nearly equal to that of the first position data d1 as superordinate data and recorded in the first storage 131. On the other hand, the correction value r2 is associated with the absolute position having resolution nearly equal to that of the second position data d2 as superordinate data and recorded in the second storage 132.

An example of a generation method for the correction values r1, r2 will be described in detail in the explanation of a manufacturing apparatus for an encoder. In respect to the absolute position with which the correction values r1, r2 are associated will be described in detail along with a manufacturing apparatus for an encoder in the explanation of the corrector 140. The outline of the generation method is as follows. For example, a manufacturing apparatus for an encoder and the like measures in advance the deviation occurring in the superordinate data to be corrected against the subordinate data and calculates the correction values r1, r2 capable of correcting the deviation amount based on the deviation amount. On the other hand, the manufacturing apparatus for an encoder and the like calculates or obtains the absolute position with the resolution of the superordinate data when the correction values r1, r2 are calculated. Sequentially, the manufacturing apparatus for an encoder and the like associates the correction values r1, r2 with the absolute positions and records them to the storage 130.

The correction value r2 against the second position data d2 repeated in one rotation (movable range) of the rotor shaft SH2, if the synchronization deviation is local and only in the single second section T2, is associated with the local absolute position and recorded in the second storage 132. On the other hand, if the synchronization deviation strides across a plurality of the second sections T2 adjacent to each other, it is preferred that the correction value r2 is set to the same value in a plurality of the second sections T2 and recorded in the second storage 132.

The corrector 140 obtains the correction value associated with the absolute position from the storage 130 based on the absolute position having resolution nearly equal to that of the superordinate data when the superordinate data obtained by the position data obtainer 120 is obtained. Sequentially, the corrector 140 corrects the superordinate data using the correction value obtained. That is to say, the corrector 140 corrects the superordinate data with low resolution in each pair of two pieces of position data of the superordinate data and the subordinate data in the consecutive height relationship of the relative relationship of resolution.

That is to say, in the embodiment of the present invention, the three pieces of position data of the first position data d1 to the third position data d3 are used. The corrector 140 corrects the deviation amount of the first position data d1 based on the correction value r1 from the relationship of a first pair of the first position data d1 and the second position data d2. The corrector 140 also corrects the deviation amount of the second position data d2 based on the correction value r2 from the relationship of the second pair of the second position data d2 and the third position data d3. In order to describe the respective corrections separately, the corrector 140 according to the embodiment of the present invention has a first corrector 141 correcting the first position data d1 and a second corrector 142 correcting the second position data d2.

The correction values r1, r2 used by the corrector 140 performing correction are, in the embodiment of the present invention, as described above, associated with the absolute positions with resolution nearly equal to that of the superordinate data to be corrected respectively when the superordinate data is obtained. Then the correction values r1, r2 are respectively recorded in the first storage 131 or the second storage 132.

The first position data d1 (an example of superordinate data) corrected by the first corrector 141 represents the absolute position of the rotor shaft SH2 using the lowest resolution out of the three pieces of position data and is also the reference absolute position data Dorg. Therefore, the first corrector 141 obtains the correction value r1 associated with the first position data d1 itself and recorded in the first storage 131 based on the first position data d1 itself. Subsequently, the first corrector 141 adds (or subtracts) the correction value r1 obtained to (or from) the first position data d1 to correct the deviation amount against the second position data d2 occurring in the first position data d1, for example. The first position data d1 after correction is referred to as a "first correction data d1'" to be distinguished from the first position data d1 before correction.

On the other hand, the second position data d2 (an example of superordinate data) corrected by the second corrector 142 represents not an absolute position but a position in a section. So the second position data d2 cannot obtain the correction value r2 based on the second position data d2 as is. Before correction processing of the second corrector 142, in the absolute position calculator 160 described later, the absolute position having resolution nearly equal to that of the second position data d2 using the second position data d2 as subordinate data is calculated. Therefore, the second corrector 142 obtains the absolute position calculated by the absolute position calculator 160. This absolute position is also referred to as a "medium absolute position" and the absolute position data representing the medium absolute position is also referred to as a "medium absolute position data Dmid". Subsequently, the second corrector 142 obtains the medium absolute position data Dmid from the absolute position calculator 160 described later and obtains the correction value r2 associated with the medium absolute position represented by the medium absolute position data Dmid and recorded in the second storage 132, based on the medium absolute position data Dmid. Then, the second corrector 142 adds (or subtracts) the correction value r2 obtained to (or from) the second position data d2 to correct the deviation against the third position data d3 occurring in the second position data d2, for example. The second position data d2 after correction is referred to as a "second correction data d2'" to be distinguished from the second correction data d2 before correction.

Unlike the embodiment of the present invention, the correction value r2 may be associated with the absolute position with lower resolution than that of the subordinate data (the third position data d3) in addition to the absolute position having resolution nearly equal to that of the superordinate data (the second position data d2) and recorded in the storage 130 (the second storage 132). In this case, the corrector (the second corrector 142) may, for example, obtain the first position data d1 (i.e., reference absolute position data Dorg) representing the absolute position with lower resolution than that of the second position data d2 that is superordinate data in addition to the third position data d3 that are subordinate data. Then, the corrector (the second corrector 142) may obtain the correction value r2 associated with the first position data d1 from the second storage 132. In the embodiment of the present invention, as described above, the corrector (the second corrector 142) obtains the absolute position (the medium absolute position) having resolution nearly equal to that of the superordinate data (the second position data d2) in the pair to be corrected from the absolute position calculator 160 (a first absolute position calculator 161) to obtain the correction value r2 associated with the medium absolute position. Therefore, in the embodiment of the present invention, accuracy against a position of correction by the corrector can be improved and more local deviation can be corrected appropriately.

In addition, the corrector 140 according to the embodiment of the present invention can correct only one pair of the two pieces of position data of the superordinate data and the subordinate data. If the corrector 140, as described in the embodiment of the present invention, corrects all of the pairs of the two pieces of position data of the superordinate data and the subordinate data, the encoder 100 can increase the tolerance against the deviation including the reproducible error and the non-reproducible error to calculate the absolute position with high accuracy more stably.

The section identifier 150 identifies the subordinate section in which the subordinate data has been obtained against the superordinate section based on the superordinate data corrected by the corrector 140 and the subordinate data when the superordinate data is obtained. That is to say, the section identifier 150, in respect to each of the pairs in the two pieces of position data that were subject to be corrected by the corrector 140, uses the superordinate data after correction and the subordinate data that forms a pair with the superordinate data to identify which one of a plurality of subordinate sections included in the superordinate section is the subordinate section to which the subordinate data attributes.

In other words, in the pair that was subject to be corrected by the corrector 140, the subordinate data represents uniquely a position in the subordinate section. Meanwhile, the subordinate section has been obtained by dividing the superordinate section by a predetermined division number and is repeated in the superordinate section. Therefore, it cannot be determined that which one of a plurality of subordinate sections the subordinate data included in the superordinate section to which the subordinate data attributes, from the subordinate data only. The section identifier 150 uses the superordinate data along with the subordinate data to identify the subordinate section to which the subordinate data attributes. On this occasion, the section identifier 150 uses the superordinate data after correction by the corrector 140, rather than the superordinate data obtained by the position data obtainer 120. Therefore, the section identifier 150 can substantially improve section identifying accuracy.

The section identifier 150 will now be described more specifically.

In the embodiment of the present invention, two pairs of the two pieces of position data in the relationship of superordinate data and subordinate data are formed (a pair of the first position data d1 and the second position data d2, a pair of the second position data d2 and the third position data d3). Therefore, the section identifier 150 identifies the subordinate section (the first section T1 or the second section T2) of the subordinate data (the first position data d1 or the second position data d2) for each of the pairs. Accordingly, the section identifier 150 has a first section identifier 151 and a second section identifier 152 in a corresponding manner to the pairs.

The first section identifier 151 and the second section identifier 152 are basically structured in the same manner excluding that section identifying is performed in different pairs. The first section identifier 151 is exemplified as below. The first section identifier 151 obtains the second position data d2 obtained by the second position data obtainer 122 as subordinate data. The first section identifier 151 also obtains the first position data d1' after correction by the first corrector 141 rather than directly obtains the first position data d1 obtained by the first position data obtainer 121 as the superordinate data. Sequentially, the first section identifier 151 identifies the second section T2 based on the second position data d2 obtained and the first position data d1' after correction.

Various section identification methods can be used here. Specifically, the subordinate section in which the subordinate data is obtained may be explicitly identified in a plurality of the subordinate sections included in the superordinate section. Otherwise, the subordinate section may be implicitly identified by identifying positions of the subordinate data against the superordinate data, for example, after the superordinate data and the subordinate data are subject to processing of superposing or adding. The processing if the subordinate section is explicitly identified is not limited to specific ones and the following processing can be used. For example, the subordinate section can be identified based on a combination of symbols after processing or positions represented by the superordinate data and the subordinate data after correction. For another example, the superordinate data after correction is made to have resolution of the division number of the subordinate data through multiplication processing, filtering processing, comparison processing with a threshold, or the like. The position represented by the superordinate data of the resolution may be directly identified as the subordinate section of the subordinate data. In the embodiment of the present invention, another section identification processing is used, in which an error in section identifying hardly occurs compared with the section identification processing above.

For the section identification processing, in the embodiment of the present invention, the following position data is used as the first position data d1 to the third position data d3. In respect to the second position data d2 that is subordinate data, the position data deviated by a half of one period in the subordinate section of the subordinate data against the first position data d1 that is superordinate data is used. In respect to the third position data d3 that is subordinate data, the position data deviated by a half of one period in the subordinate section of the subordinate data against the second position data d2 that is superordinate data is used.

In order to generate a plurality of position data deviated by a half of one period of the subordinate section to each other, each of the detection mechanisms (the first detection mechanism to the third detection mechanism) in which the position data obtainer 120 obtains position data are formed to be deviated by a half of one period of the subordinate section. In other words, a period of a plurality of subordinate sections (a pitch) of the third detection mechanism that uses optical detection principles does not perfectly match with a period of one superordinate section (a pitch) of the superordinate second detection mechanism. Accordingly, each of the detection mechanisms is formed to be deviated by a half of one period (half a pitch) of the subordinate section. The second detection mechanism and the first detection mechanism are also formed in the similar position relationship. As a result, a plurality of position data are formed so as to be deviated by a half of one period of the subordinate section as described above.

Similar to the description above, the first section identifier 151 is exemplified as below. The first section identifier 151 is generated as above and obtains the first position data d1' and the second position data d2 deviated to each other by a half of one period of the second section T2 that is subordinate section. The first section identifier 151 firstly performs resolution change processing to temporarily match the resolution of the second position data d2 equivalent to the subordinate data having high resolution with the resolution of the first position data d1' equivalent to the superordinate data. The resolution change processing may be performed with temporarily improved resolution by performing multiplication processing to the first position data d1'. Otherwise, The resolution change processing may be performed with temporarily decreased resolution by performing division processing on the second position data d2. In another example of the resolution change processing, for subsequent processing to be easily performed, multiplication or division processing may be performed on the first position data d1' and the second position data d2 to match the resolution of them with each other. The resolution change processing may be performed, for example, out of the section identifier 150, or in multiplication processing in the position data obtainer 120.

After the resolution change processing, the first section identifier 151 subtracts the second position data d2 from the first position data d1', which have been made to have the same resolution. Then, the first section identifier 151 divides the subtraction result by the division number in the second section T2 used when the resolution is matched with each other, and makes the division result an integer by rounding the division result down to the nearest decimal, for example. As a result, the integer that is a calculation result of some of the processing as above is to represent uniquely the second section T2 that is a subordinate section against a superordinate section (refer to FIGS. 5 and 6).

In the section identification processing according to the embodiment of the present invention, the deviation amount in the superordinate data against the subordinate data is included in the division result mainly as a value after the decimal point, that is, less than one. Therefore, when the division result is made to an integer, a relatively large deviation amount can be corrected. Meanwhile, in this section identification processing, determination processing through a predetermined logic, for example, is not necessary and the subordinate section can be identified by direct calculation. As a result, processing load can be reduced.

In this section identification processing, when resolution of the superordinate data is matched temporarily with that of the subordinate data, if the resolution is set higher, the deviation amount correctable increases. However, even when the resolution is improved, if the superordinate data deviates, for example, by a half of the subordinate section or more, the deviation amount is included in the division result as a value equal to or larger than one. As a result, the deviation amount becomes difficult to be corrected even if the section identification processing is used.

Nevertheless, the encoder 100 according to the embodiment of the present invention corrects the superordinate data used for section identification processing in advance using a correction value by having the corrector 140, for example, to identify the subordinate section from the superordinate data after correction and the subordinate data. Therefore, as an example of such a correction value, a value that can correct, for example, a reproducible error is recorded in advance in the storage 130. As a result, the encoder 100 according to the embodiment of the present invention can reduce reproducible errors before the section identification processing so as to be able to improve accuracy in section identification processing in the section identifier 150. That is to say, the encoder 100 according to the embodiment of the present invention performs section identification accurately to be able to generate the absolute position with high accuracy even if a relatively large error occurs.

After that, the first section identifier 151 outputs the second section T2 identified to the absolute position calculator 160. On the other hand, the second section identifier 152 identifies the third section T3 through a processing similar to that of the first section identifier 151 to output the third section T3 identified to the absolute position calculator 160.

The absolute position calculator 160 calculates the absolute position with resolution nearly equal to that of the subordinate data based on the subordinate section that has already been identified by the section identifier 150 and the subordinate data of which subordinate section has been identified. As a result, the absolute position calculator 160 can calculates an absolute position data Dabs representing the absolute position having resolution nearly equal to that of the position data with the highest resolution to be output to the control apparatus CT.

On this occasion, the absolute position calculator 160, at a stage before calculating the final absolute position with the highest resolution, also calculates the medium absolute position data Dmid representing the medium absolute position having a medium resolution nearly equal to that of the subordinate data, based on all of the subordinate sections already identified by the section identifier 150 and the subordinate data with the highest resolution out of the position data included in the pairs for which the section identifier 150 has already identified the subordinate sections, to output the data to the corrector 140.

In the encoder 100 according to the embodiment of the present invention in which three pieces of position data are used, the absolute position with resolution nearly equal to that of the third position data d3 having the highest resolution is calculated. In addition, as the medium absolute position, the absolute position with resolution nearly equal to that of the second position data d2 having the medium resolution is calculated. Therefore, the absolute position calculator 160 according to the embodiment of the present invention has the first absolute position calculator 161 as a structure for calculating the latter medium absolute position, and a second absolute position calculator 162 as a structure for calculating the former final absolute position.

The first absolute position calculator 161 obtains the second section T2 identified by the first section identifier 151 and the second position data d2 obtained by the second position data obtainer 122. Sequentially, the first absolute position calculator 161 calculates the medium absolute position based on the second section T2 and the second position data d2 obtained. In other words, the second section T2 identified represents the position of the second section T2 against the first section T1 (i.e., one rotation of movable range). On the other hand, the second position data d2 represents a position in a section in the second section T2. Therefore, the first absolute position calculator 161 can calculate the medium absolute position through accumulation processing, for example, in which the second section T2 becomes higher bits of the medium absolute position and the second position data d2 becomes lower bits of the medium absolute position.

If the resolution of the second position data d2 is temporarily converted into lower resolution than the original resolution by the position data obtainer 120 or the section identifier 150, for example, it is preferred that the first absolute position calculator 161 calculates the medium absolute position after converting the resolution of the second position data d2 into the higher original resolution by performing, for example, multiplication processing on the second position data d2.

The medium absolute position data Dmid calculated by the first absolute position calculator 161 is output to the second corrector 142 to be used for obtaining the correction value r2 in the second corrector 142, as described above. After that, the second corrector 142 corrects the second position data d2 and the second section identifier 152 uses the second position data d2' after correction to identify the third section T3 against the second position data d2'.

On the other hand, the second absolute position calculator 162 obtains the second section T2 and the third section T3 identified by the first section identifier 151 and the second section identifier 152, and obtains the third position data d3 obtained by the third position data obtainer 123.

On this occasion, in the same manner as the first absolute position calculator 161, if the resolution of the third position data d3 is temporarily converted into lower resolution than the original resolution by the position data obtainer 120 or the section identifier 150, for example, the second absolute position calculator 162 converts the resolution of the third position data d3 into the higher original resolution by performing, for example, multiplication processing on the third position data d3.

Additionally, in the same manner as the first absolute position calculator 161, the second absolute position calculator 162 calculates the absolute position data Dabs representing an absolute position with substantially high resolution through accumulation processing in which the second section T2 identified becomes the highest bit of the final absolute position data Dabs, the third section T3 identified becomes the medium bits, and the third position data d3 with high resolution becomes the lowest bit, for example. The absolute position data Dabs calculated is then output to the control apparatus CT.

(1-4. Operations of the Encoder)

Figure 3:
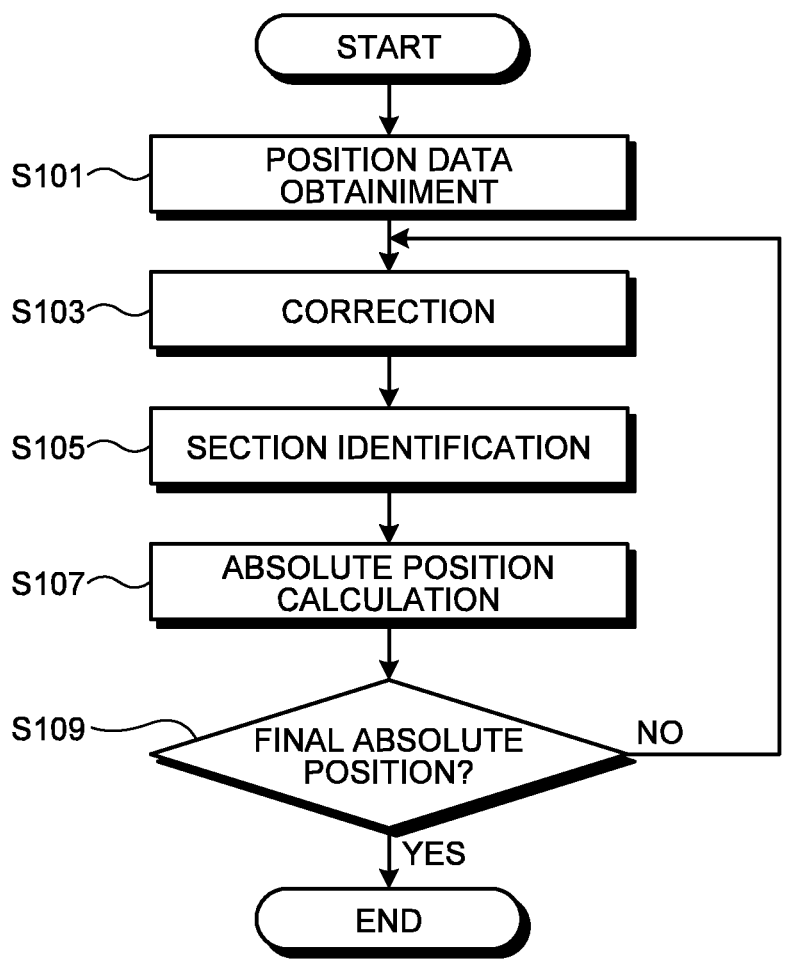
FIG. 3 is a schematic diagram for illustrating operations of the encoder according to the embodiment of the present invention.

The absolute position calculation operation of the encoder 100 according to the embodiment of the present invention as explained above will be now described with reference to FIG. 3. FIG. 3 is a schematic diagram for illustrating operations of the encoder according to the embodiment of the present invention.

When absolute position calculation processing is started, for example, in accordance with command signals of the control apparatus CT or the like, the encoder 100 firstly performs processing on Step S101.

At Step S101 (an example of position data obtaining step), the position data obtainer 120 obtains a plurality of the detection signals including abso-signals (1X signal, 4X signal, 16X signal) nearly at the same time. Then, position data obtainer 120 performs, digital to analog conversion processing, multiplication processing, and the like on the detection signals to generate a plurality of the first position data d1 to the third position data d3 having different resolutions. After the processing at Step S101, the procedure goes to Step S103.

Steps S103 to S107 are repeated until calculation of the final absolute position data Dabs with high resolution is completed. Processing at Steps S103 to S107 for the first time will now be described. Processing at Steps S103 to S109 for the second time will be described following the explanation on Step S109.

In processing at Step S103 (an example of a correction step) for the first time that is started after the processing at Step S101, the first corrector 141 obtains the correction value r1 associated with the absolute position of the first position data d1, based on the first position data d1 that is reference absolute position data Dorg representing the absolute position, from the first storage 131. Subsequently, the first corrector 141 adds (or subtracts) the correction value r1 obtained to (or from) the first position data d1 to generate the first position data d1' after correction. The procedure goes to Step S105.

In processing at Step S105 (an example of a section identification step) for the first time, the first section identifier 151 identifies the second section T2 of the second position data d2 against the first position data d1 based on the first correction data d1' corrected at Step S103 and the second position data d2 obtained at Step S101. The procedure goes to Step S107.

In processing at Step S107 (an example of an absolute position calculation step) for the first time, the first absolute position calculator 161 calculates the medium absolute position that is the absolute position with resolution nearly equal to that of the second position data d2 based on the second section T2 identified at Step S105 and the second position data d2 obtained at Step S101. The procedure goes to Step S109.

At Step S109, the encoder 100 determines whether the absolute position calculated at Step S107 is the final absolute position with high resolution (absolute position data Dabs) or not. If it has not been the absolute position data Dabs, that is, if it has been the medium absolute position data Dmid, the procedure goes to Step S103.

At Step S103 processed after the processing at Step S109, that is, in processing at Step S103 (an example of a correction step) for the second time, the second corrector 142 obtains the correction value r2 associated with the absolute position of the medium absolute position data Dmid based on the medium absolute position data Dmid calculated at Step S107 from the second storage 132. Then, the second corrector 142 adds (or subtracts) the correction value r2 obtained to (or from) the second position data d2 to generate the second position data d2' after correction. The procedure goes to Step S105.

At Step S105 (an example of a section identification step) for the second time, the second section identifier 152 identifies the third section T3 of the third position data d3 against the second position data d2, based on the second correction data d2' corrected at Step S103 and third position data d3 obtained at Step S101. The procedure goes to Step S107.

At Step S107 (an example of an absolute position calculation step) for the second time, the second absolute position calculator 162 calculates the absolute position having the final high resolution nearly equal to that of the third position data d3 based on the second section T2 and the third section T3 identified at Step S105, and the third position data d3 obtained at Step S101. The procedure goes to Step S109.

At Step S109, as described above, the encoder 100 determines whether the absolute position calculated at Step S107 is the final absolute position with high resolution (absolute position data Dabs) or not. After the processing at Step S107 for the second time, the absolute position described above is determined to be the absolute position data Dabs, which is output to the control apparatus CT to complete the operation.

(1-5. Examples of Error Corrections by the Encoder)

Figure 7:
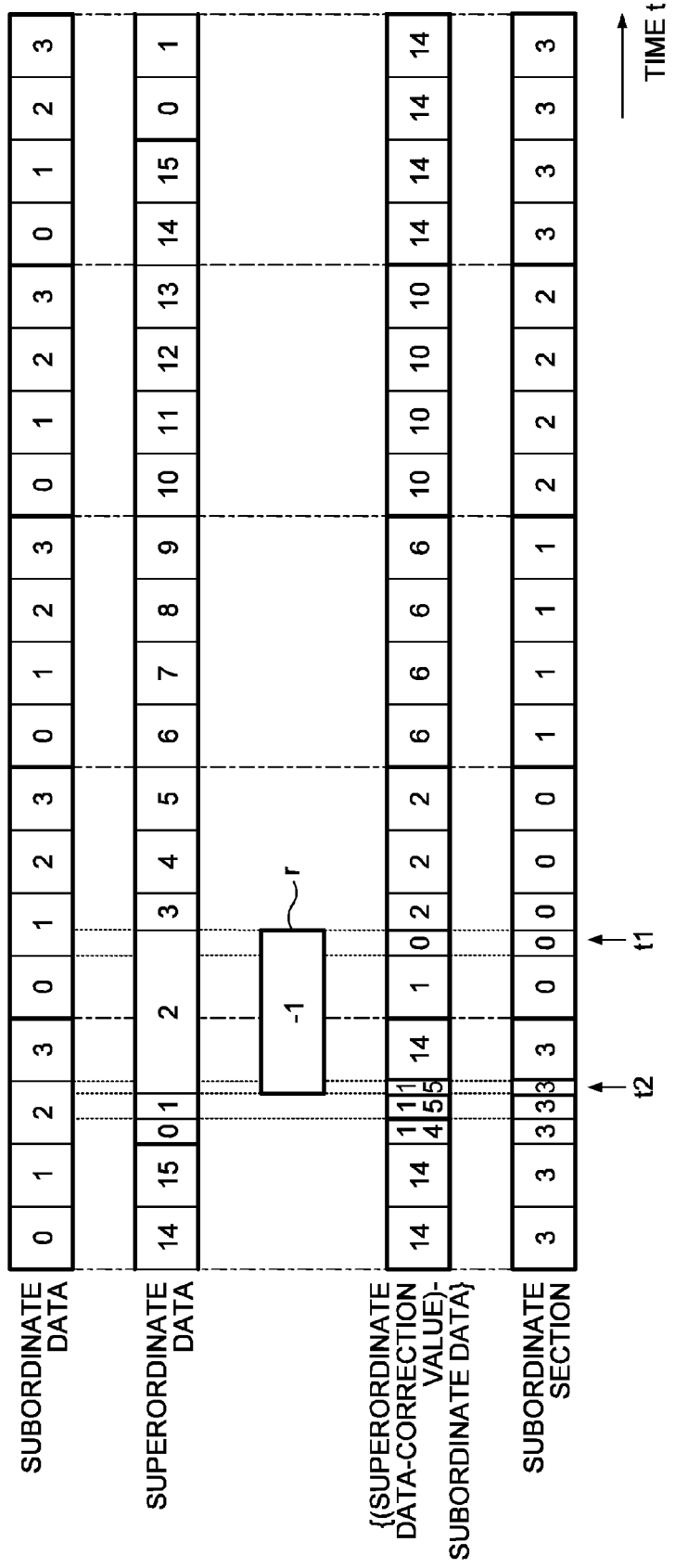
Figure 8:
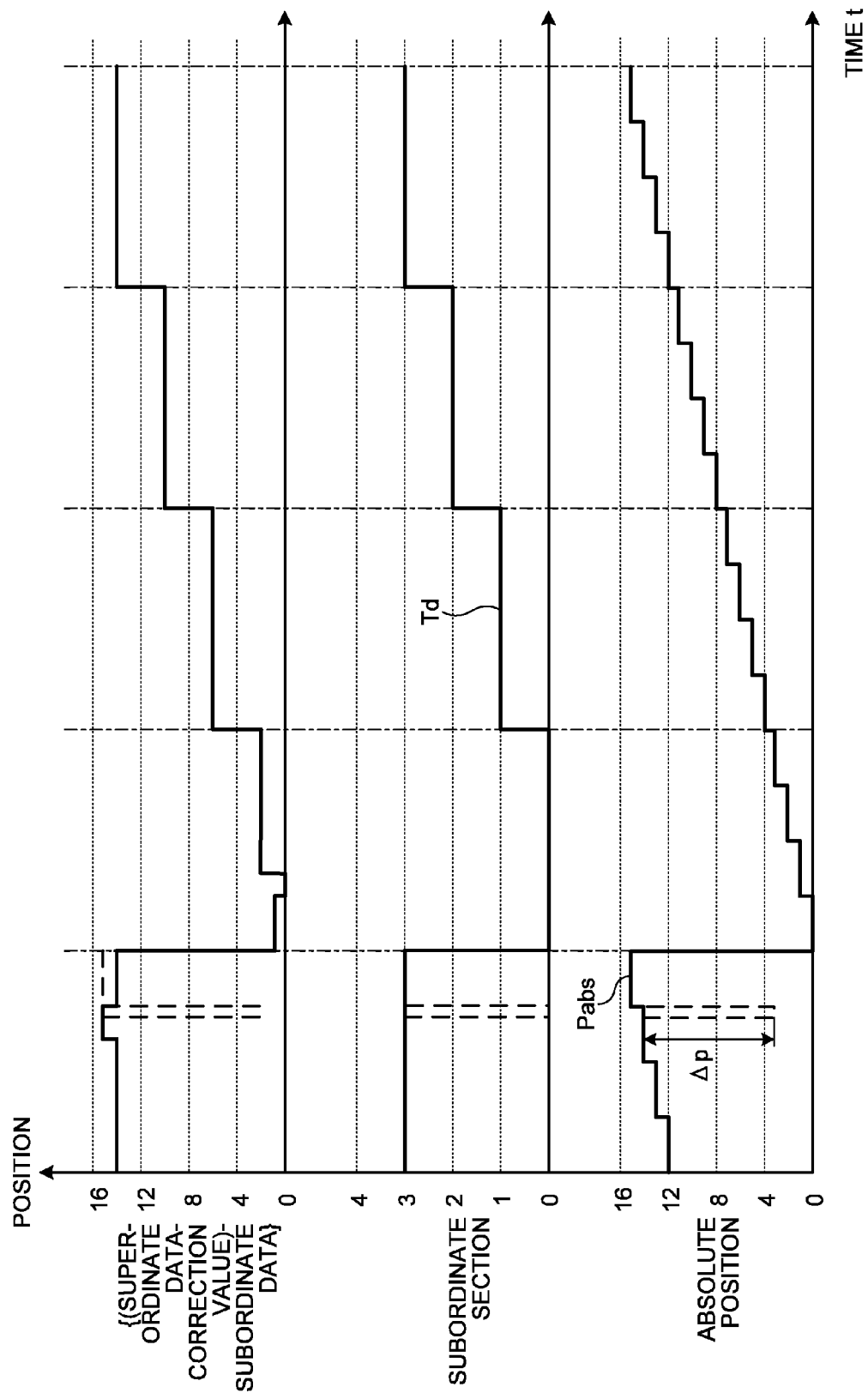
Figure 9:
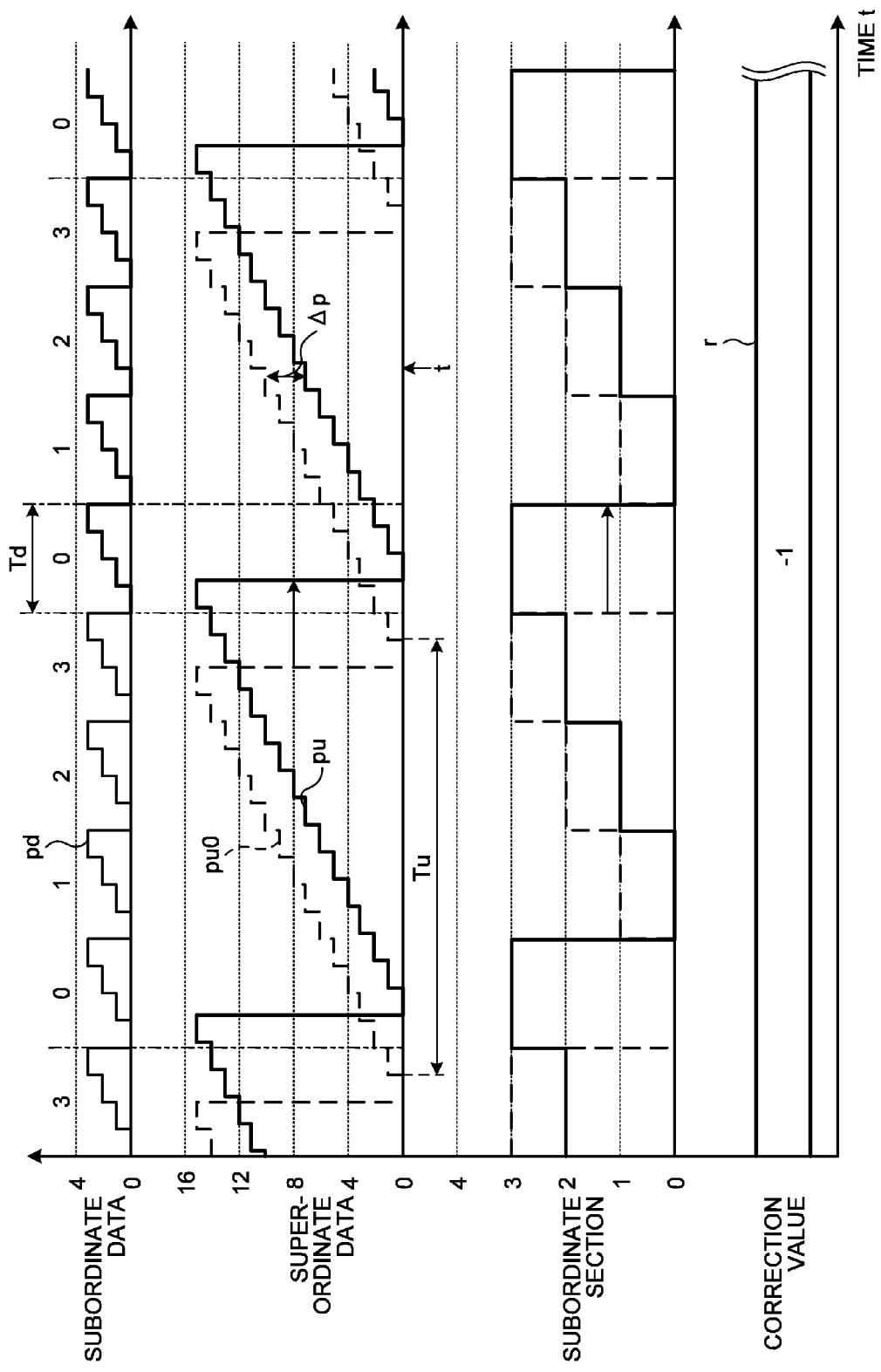
FIG. 9 is a schematic diagram for illustrating an example of a second error correction by the encoder according to the embodiment of the present invention.

The structure and operations of the encoder 100 and the like according to the embodiment of the present invention has been described above. In order for particular operations and effects of the encoder 100 to be understood easily, examples of error corrections by the encoder 100 will now be described with reference to FIGS. 4 to 9. FIGS. 4 to 8 are schematic diagrams for illustrating examples of a first error correction by the encoder according to the embodiment of the present invention. FIG. 9 is a schematic diagram for illustrating an example of a second error correction by the encoder according to the embodiment of the present invention.

In the embodiment of the present invention, an example is described, in which a plurality of position data used for the absolute position calculation are three data of the first position data d1 to the third position data d3. By the way, processing such as correction processing, section identification processing, and absolute position calculation processing is performed, basically, for each pair of the two pieces of position data of the superordinate data and the subordinate data. Therefore, description will be made below such that the superordinate data may be the subordinate data, and vice versa, and differences those may occur depending on which of the first position data d1 to the third position data d3 is used, will be described supplementarily as necessary.

FIGS. 4 to 9 illustrates examples in which the rotor shaft SH2 that is a moving body rotates at a constant speed and the abscissa axe indicates a time t. An example in which the resolution of the superordinate data is temporarily matched with that of the subordinate data is described below for convenience of description on the section identification processing, etc.

(1-5-1. Examples of a First Error Correction)

Firstly with reference to FIGS. 4 to 8, an example of a first error correction is described, in which the superordinate data are deviated locally against the subordinate data and synchronization deviation occurs therebetween.

Figure 4:
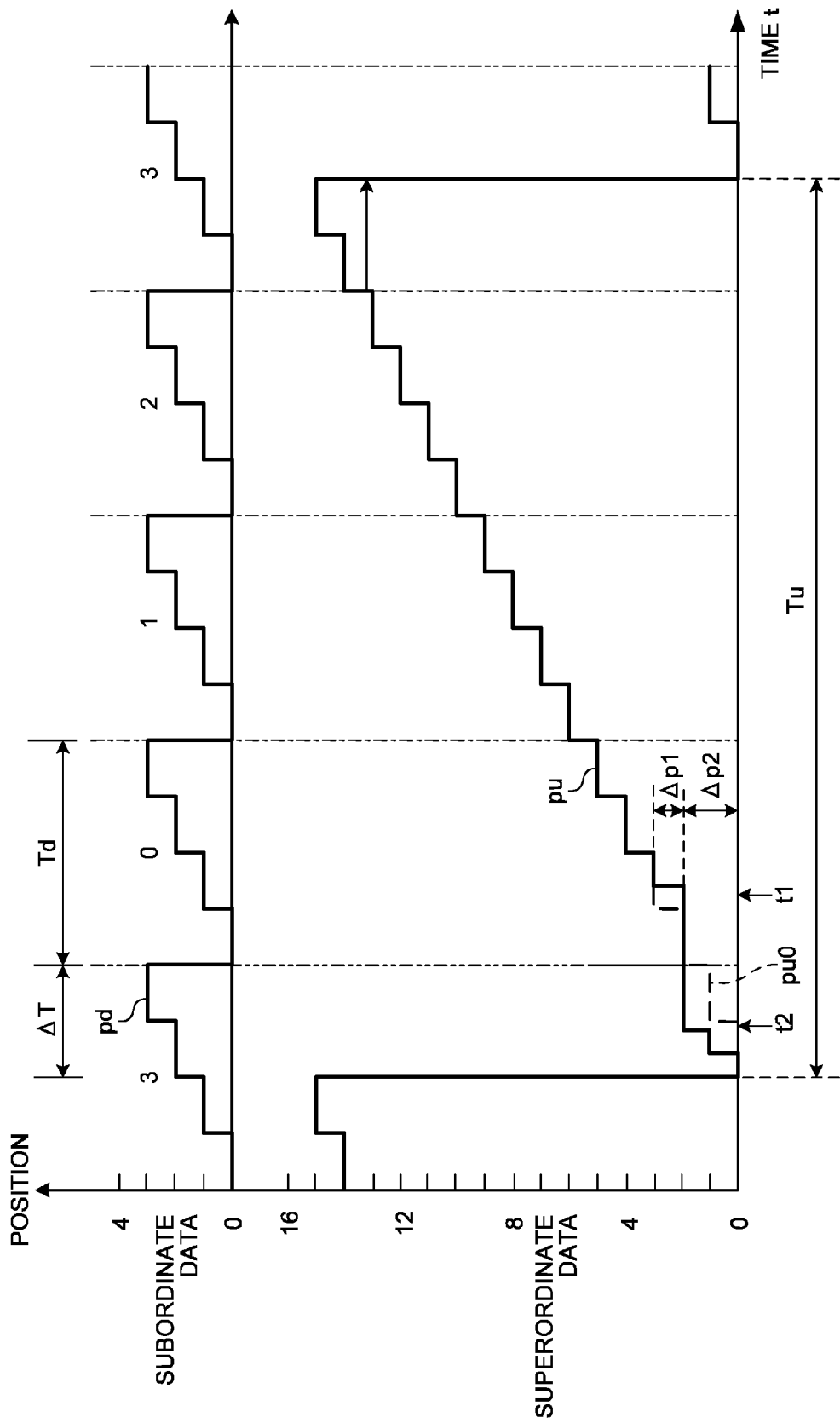
FIG. 4 to FIG. 8 is a schematic diagram for illustrating an example of a first error correction by the encoder according to the embodiment of the present invention.

As illustrated in FIG. 4, because the section identification processing according to the embodiment of the present invention is used here, subordinate data is generated to be deviated by a half of one period of a subordinate section Td of the subordinate data ($\Delta T$) against the superordinate data. That is to say, in this example, a break of the subordinate section Td of subordinate data comes to be late by delay $\Delta T$ (=Td/2) from a break of the superordinate section Tu of the superordinate data. The delay $\Delta T$ is also applied in an example of a second error correction.

The superordinate data is not synchronized with the subordinate data locally and a profile of the superordinate data is illustrated as a superordinate position pu represented with a solid line. On the other hand, because the subordinate data represents more accurate positions than the superordinate data, a profile of the subordinate data is illustrated, in FIG. 4, as a subordinate position pd that increases regularly in one period in which no synchronization deviation occurs. The profile of the superordinate data when no synchronization deviation occurs is illustrated as a higher position pu0 represented with a dashed line locally. Therefore, for example, a deviation amount $\Delta p1$ occurs in the superordinate data at a time point t1 and a deviation amount $\Delta p2$ occurs in the superordinate data at a time point t2.

Figure 5:
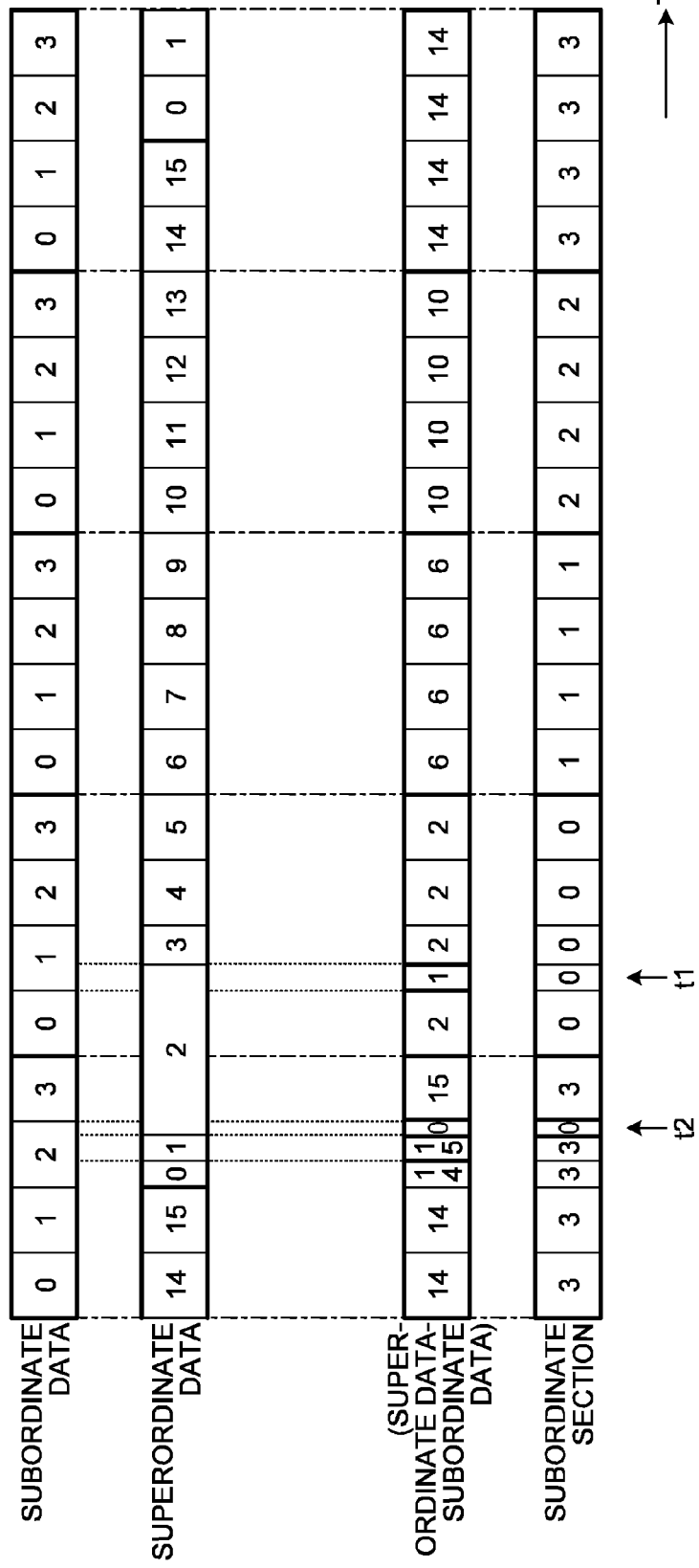
Figure 6:
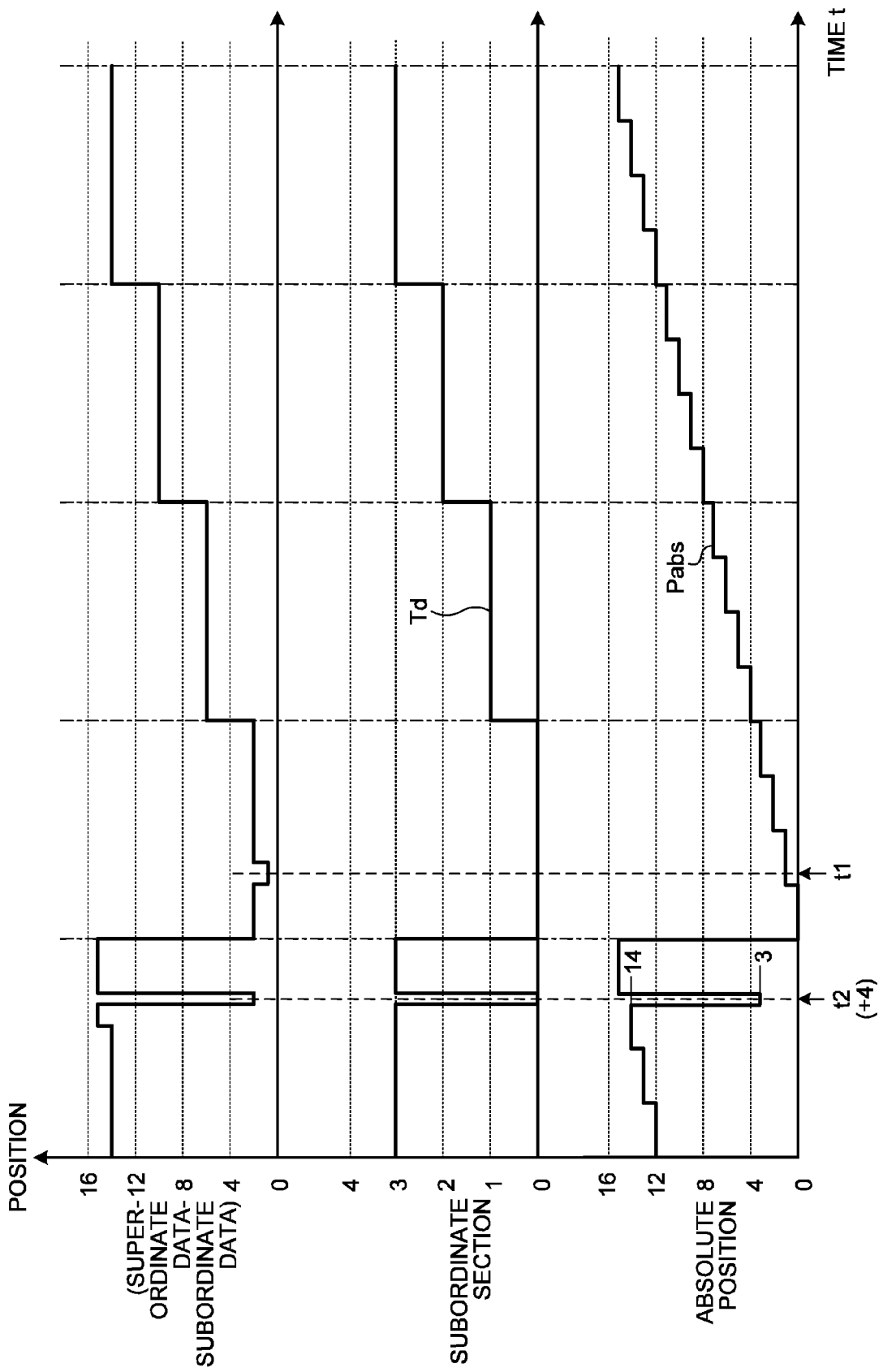

The superordinate data in which the deviation amounts $\Delta p1$, $\Delta p2$ occur locally and the subordinate data without error as described above are represented digitally in FIG. 5. In section identification processing in the section identifier 150 according to the embodiment of the present invention, the subordinate data is subtracted from the superordinate data. The subtraction results are illustrated digitally in FIG. 5 and illustrated graphically in FIG. 6. As illustrated in FIGS. 5 and 6, at a medium stage of section identification processing in the section identifier 150, errors corresponding to the deviation amounts $\Delta p1$, $\Delta p2$ are included at both time points t1 and t2. The results of the subordinate data subtracted from the superordinate data are divided by a division number in one of the subordinate sections Td of the subordinate data (in FIG. 4 etc., divided into four, from 0 to 3), and the calculation results are rounded down to the nearest decimal so that the subordinate section Td is directly calculated. The subordinate sections Td identified are illustrated in FIGS. 5 and 6. In the subordinate sections Td illustrated in FIGS. 5 and 6, at the time point t1, an error due to the deviation amount $\Delta p1$ is corrected appropriately so that an accurate subordinate section Td (0) is calculated. On the other hand, at the time point t2, because the deviation amount $\Delta p2$ is larger than a tolerance, the subordinate section Td (0) identified includes an error, and an error thus occurs (+1) against the true subordinate section Td (3). An absolute position Pabs calculated in the absolute position calculator 160 from the subordinate section Td identified and the subordinate data is illustrated in FIG. 6. As illustrated in the absolute position Pabs at the time point t2, the error occurring during section identification by the section identifier 150 is also included in the absolute position Pabs.

In order to correct such errors, the encoder 100 according to the embodiment of the present invention has the storage 130 and the corrector 140. A correction value r that will be recorded in advance in the storage 130 is illustrated in FIG. 7. The deviation amount $\Delta p2$ at the time point t2 described above is +2. Therefore, –1 is set as the correction value r so as to be able to correct the error due to the deviation amount $\Delta p2$.

The deviation amount $\Delta p2$ is set as the correction value r against the time point t2 described above. The correction value r is associated with the absolute position having nearly equal to that of the superordinate data and recorded in the storage 130. Therefore, the correction value r (=–1) is associated with the superordinate data pu (=2) and recorded in the storage 130. In FIG. 7, the superordinate data is illustrated to be assumed to represent the absolute position.

Therefore, the corrector 140 obtains the correction value r (=–1) associated with and based on the absolute position having resolution nearly equal to that of the superordinate data at the time point t2, for example. Subsequently, the corrector 140 adds the correction value r obtained to the superordinate data to correct the superordinate data. The section identifier 150 subtracts the subordinate data from the superordinate data after correction. The subtraction results and the subordinate sections Td identified from the subtraction results are illustrated in FIGS. 7 and 8. Additionally, in FIG. 8, the absolute positions Pabs calculated from the subordinate section Td are illustrated.

As illustrated in FIGS. 7 and 8, even at the time point t2 when the error occurred in the subordinate sections Td not corrected and illustrated in FIGS. 5 and 6, appropriate correction is performed. Therefore, the encoder 100 according to the embodiment of the present invention, as illustrated in FIG. 8, can correct the relatively large deviation amount $\Delta p2$ appropriately if it occurs. As a result, the absolute position Pabs without an error can be generated.

As an example of the first error correction, a case in which synchronization deviation occurs locally in the superordinate data has been described. However, in a case of synchronization deviation, for example, which occurs against the third position data d3, in the second position data d2 described above in which a plurality of the second sections T2 are repeated in a movable range (one rotation), an error across a plurality of superordinate sections Tu (in this case, a plurality of the second sections T2) may occur in addition to local errors. Such an error is referred to as a long-period error.

In this respect, the encoder 100 according to the embodiment of the present invention can correct a long-period error across a plurality of superordinate sections Tu in addition to local errors appropriately. Therefore, an error correction by the encoder 100 when such an error across a plurality of superordinate sections Tu occurs will now be described as examples of a second error correction.

(1-5-2. Examples of a Second Error Correction)

In FIG. 9, the superordinate data representing the superordinate positions pu of the superordinate sections Tu repeated in the movable range (one rotation) rather than the absolute position, and the subordinate data representing the subordinate positions pd of the subordinate section Td repeated in the superordinate sections Tu are illustrated. As illustrated in FIG. 9, in superordinate data, synchronization deviation (the deviation amount $\Delta p$) occurs against the subordinate data in a plurality of superordinate sections Tu (all superordinate section Tu illustrated in FIG. 9) rather than locally. In this case, as illustrated in FIG. 9, in the subordinate sections Td identified by the section identifier 150, errors will occur due to the influence of the deviation amount $\Delta p$ across all of the superordinate sections Tu in which the synchronization deviation has occurred, unless correction by the corrector 140 is performed. In this case, occurrence of an error itself can be hardly identified by only error correction by the section identifier 150.

In this case, in the storage 130 of the encoder 100 according to the embodiment of the present invention, the correction value r in which the same value is set across a plurality of superordinate sections Tu adjacent to each other is recorded to be associated with the respective absolute positions. The correction value r is illustrated in FIG. 9 schematically. If such a long-period error occurs, the encoder 100 according to the embodiment of the present invention can correct all of the superordinate data entirely in a plurality of superordinate sections Tu using the correction value r, in which the same value is set across a plurality of superordinate sections Tu. Therefore, the encoder 100, across the entire range in which the long-period error occurred, can appropriately corrects errors that cannot be corrected through the section identification processing by the section identifier 150 to be able to stably generate the absolute position with high accuracy.

(1-6. Examples of Effects of the Embodiment of the Present Invention)

The encoder 100 according to the embodiment of the present invention, operations of the encoder 100, and the driving apparatus DV including the encoder 100 have been described. According to the encoder 100 etc., when the absolute position with high resolution is calculated using the multiplication accumulation method, before identifying subordinate sections by the section identifier 150, the superordinate data used for section identification is corrected by the corrector 140. Therefore, even if a deviation amount larger than the deviation amount correctable by the section identifier 150 occurs, the encoder 100 etc. corrects influences due to the deviation amount to be able to stably measure the absolute position with high resolution. On this occasion, the correction value r used in the corrector 140 for correction against the superordinate data is determined in accordance with the deviation amount $\Delta p$ measured in advance. Therefore, the component of the deviation amount $\Delta p$ corrected with the correction value r can also be said to be a reproducible error. As in the encoder 100 etc., by correcting non-reproducible errors by the section identifier 150 after correcting reproducible error in advance by the corrector 140, robustness against errors can be substantially improved.

When the absolute position is calculated from three or more pieces of position data, the encoder 100 can improve error proof performance as described above by correcting the superordinate data of any one of a plurality of pairs of the superordinate data and the subordinate data. Furthermore, as in the encoder 100 according to the embodiment of the present invention, when correction is made for all of the pairs by the corrector 140, error proof performance can be further improved.

When position data that represents no absolute positions is subject to be corrected as superordinate data, in the embodiment of the present invention, in order to identify an error value r, based on the medium absolute position that has been already calculated by the absolute position calculator 160 and having resolution nearly equal to that of superordinate data, the corrector 140 obtains the correction value r associated with the medium absolute position to correct the superordinate data. Therefore, the corrector 140 can perform correction with sufficient accuracy to improve accuracy of correction.

The section identification processing used by the section identifier 150 in the embodiment of the present invention has higher tolerance to errors and has smaller load in the section identification processing than in other section identification processing. Additionally, in the section identification processing according to the embodiment of the present invention, the subordinate section can be obtained directly through calculation processing so that the correction value r used in the corrector 140 can be identified easily. Therefore, if section identification processing according to the embodiment of the present invention is used, the encoder 100 etc. can be further easily manufactured.

<2. Manufacturing the Encoder According to the Embodiment of the Present Invention>

Manufacturing for the encoder according to the embodiment of the present invention and others will now be described referring to a generation method of the correction value r and the like. It should be noted that a generation method of the correction value r and the like is not limited to specific ones as long as a method in which the deviation amount that occurs in the superordinate data against the subordinate data can be corrected appropriately, and various generation methods similar to the generation methods described below or the like may be used. In the description below, generation methods in which the correction value r is generated more easily and accurately out of possible variations of the generation methods will be described with reference to some examples.

(2-1. The Structure of the Manufacturing Apparatus for the Encoder)

Figure 10:
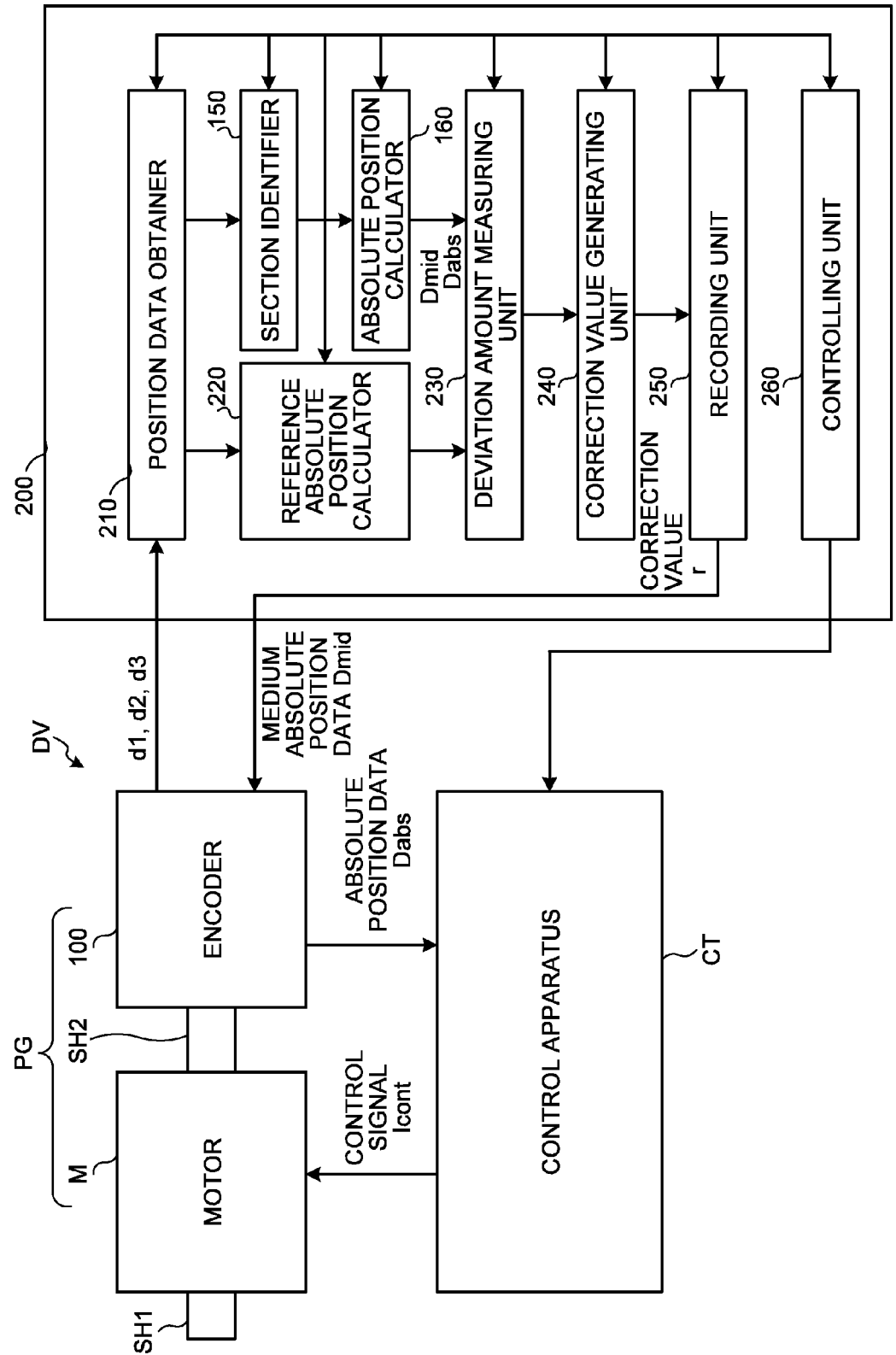
FIG. 10 is a schematic diagram for illustrating an example of a structure of a manufacturing apparatus for the encoder according to the embodiment of the present invention.

An example of the structure of the manufacturing apparatus 200 for the encoder according to the embodiment of the present invention is described with reference to FIG. 10. FIG. 10 is a schematic diagram for illustrating an example of the structure of a manufacturing apparatus for the encoder according to the embodiment of the present invention.

As illustrated in FIG. 10, the manufacturing apparatus 200 has a position data obtainer 210, the section identifier 150, the absolute position calculator 160, a reference absolute position calculator 220, a deviation amount measuring unit 230, a correction value generating unit 240, a recording unit 250, and a controlling unit 260.

The manufacturing apparatus 200 is, for example, connected to the driving apparatus DV to obtain the position data obtained in the encoder 100 from the driving apparatus DV and output the upper command signals for controlling the driving apparatus DV to the control apparatus CT of the driving apparatus DV. Therefore, in the manufacturing apparatus 200, the control apparatus CT controls the power generation apparatus PG in accordance with the upper command signals of the manufacturing apparatus 200. However, when manufacturing the encoder 100 alone, the structure of the manufacturing apparatus 200 can be changed so as to have the control apparatus CT and the motor M, for example, in the same manner as the driving apparatus DV illustrated in FIG. 10.

The controlling unit 260 included in the manufacturing apparatus 200 generates upper command signals to be output to the control apparatus CT in order to achieve the operations described below. The controlling unit 260 also controls other components in the manufacturing apparatus 200 in order to achieve the operations described below. Functions of the other components in the manufacturing apparatus 200 other than the controlling unit 260 (the position data obtainer 210, the section identifier 150, the absolute position calculator 160, the reference absolute position calculator 220, the deviation amount measuring unit 230, the correction value generating unit 240, and the recording unit 250) will be described in detail below in operation examples to avoid overlapped explanation.

(2-2. Operations of the Manufacturing Apparatus for the Encoder)

Figure 11:
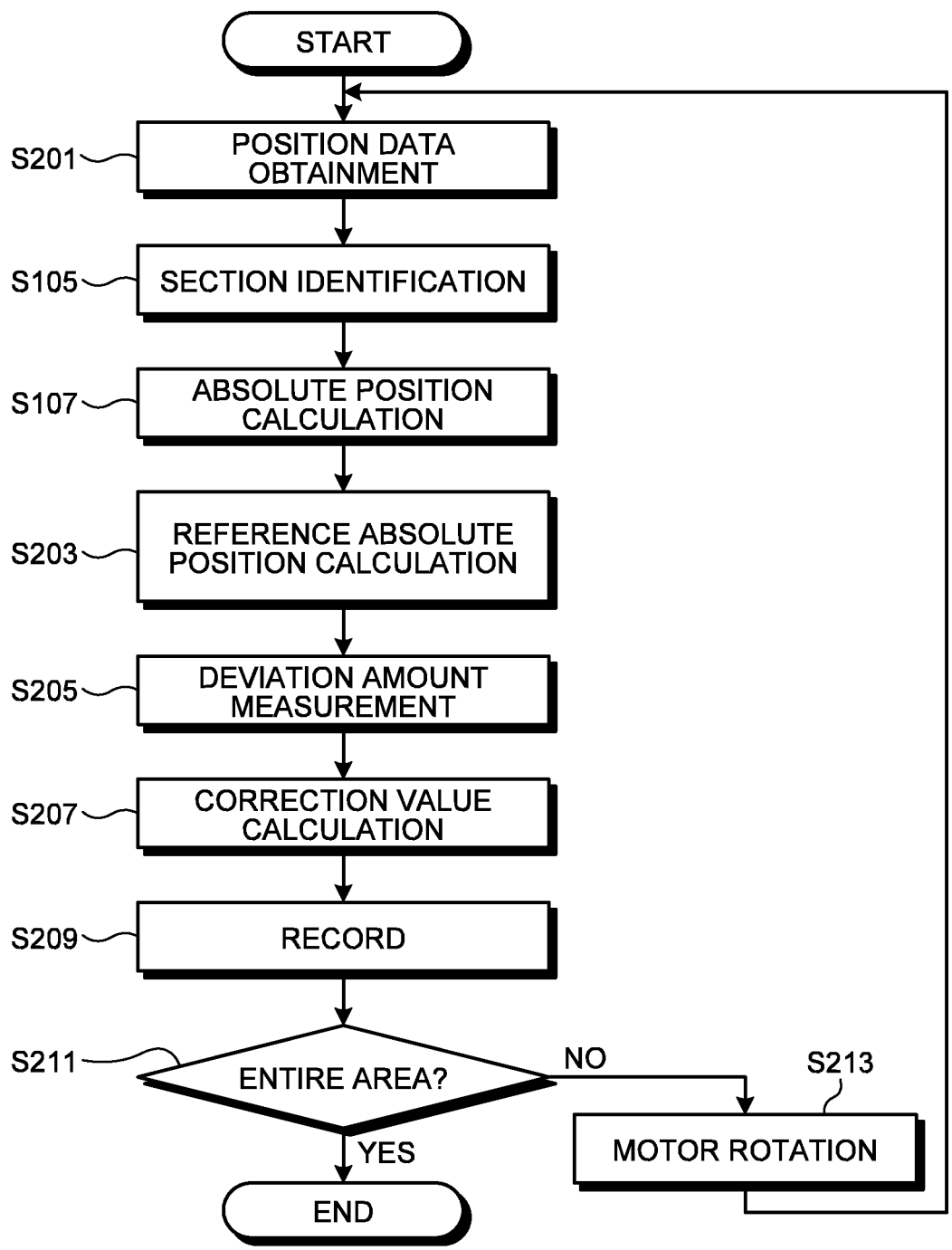
FIG. 11 is a schematic diagram for illustrating an example of operations of the manufacturing apparatus for the encoder according to the embodiment of the present invention.

An example of operations of the manufacturing apparatus 200 for the encoder according to the embodiment of the present invention illustrated in FIG. 10 is described with reference to FIG. 11. FIG. 11 is a schematic diagram for illustrating an example of operations of the manufacturing apparatus for the encoder according to the embodiment of the present invention.

The manufacturing apparatus 200 performs processing on the steps illustrated in FIG. 11 in respect to all of one or more superordinate data (e.g., the first position data d1 or the second position data d2) that could be subject to correction to generate the correction value r to be recorded in the storage 130 of the encoder 100. On this occasion, the manufacturing apparatus 200 identifies the correction value r for each pair of the two pieces of position data to be subject to correction. Therefore when a plurality of pairs exist, that is, when three or more pieces of position data are used to measure the absolute position, the manufacturing apparatus 200 performs processing on the steps illustrated in FIG. 11 for each of a plurality of pairs in ascending order of resolution of the superordinate data to be subject to correction in the plurality of pairs. Then, the manufacturing apparatus 200 stores the correction value r to the encoder 100. An example is described below, in which processing is made on the steps for pairs having the superordinate data with the lowest resolution is described, and differences depending on the steps for other pairs will be described supplementarily as necessary.

The manufacturing apparatus 200 also generates the correction value r across the entire movable range (i.e., one rotation) of the rotor shaft SH2 that is a moving body by performing processing on the steps illustrated in FIG. 11 to thereby store the correction value r in the encoder 100. For that purpose, the manufacturing apparatus 200 needs to generate the correction value r in the absolute positions. It should be noted that even if the correction value r becomes 0 it exists. Processing in which the correction value r across the entire rotation is generated as described above is illustrated conceptually in FIG. 11 as loop processing in a branch at Step S211. In this case, the steps on which the loop processing is performed at Step S211 mean processing for generating the correction value r in one position to be recorded in the encoder 100. However, operations of the manufacturing apparatus 200 for the encoder according to the embodiment of the present invention are not limited to ones described above. An operation is available, in which all of the correction values r are generated sequentially for entire area and after correction values r are generated, all of the correction values r are recorded in the encoder 100. In this case, Step S209 will be processed after the loop processing at Step S211.

Generation for the correction value r against one absolute position for one pair and the like will be described in detail later. However, timing or a method for storing the correction value r in the encoder 100, in addition to timing or a method in relative relationships with generation processing of generating the correction value r of other pairs are not limited to the examples of operations described below and a lot of variations may be used.

Now, a process will be specifically described in detail below, in which the correction value r correcting the superordinate data is generated for pairs including the superordinate data with the lowest resolution and the correction value r is output to the encoder 100.

As illustrated in FIG. 11, Step S201 is processed, in which the position data obtainer 210 of the manufacturing apparatus 200 obtains the superordinate data and the subordinate data obtained by the position data obtainer 120 of the encoder 100. Then, the procedure goes to Step S 105 and subsequent Step S 107.

At Steps S105 and S107, in the same manner as processing in operations of the encoder 100 illustrated in FIG. 3, the section identifier 150 of the manufacturing apparatus 200 identifies the subordinate section of the subordinate data against the superordinate data and the absolute position calculator 160 of the manufacturing apparatus 200 generates an absolute position based on the subordinate section and the subordinate data identified. The absolute position generated after processing at Steps S105 and S107 becomes the absolute position with the highest resolution derivable from the pair in which the correction value r is generated. Therefore, the absolute position data representing the absolute position becomes the medium absolute position data Dmid, for example, when a pair of the first position data d1 and the second position data d2 is processed, and becomes the absolute position data Dabs representing the final absolute position when a pair of the second position data d2 and the third position data d3 is processed.

However, in the processing at Steps S105 and S107 in the manufacturing apparatus 200, unlike the absolute position calculation process in the encoder 100, the absolute position is calculated using the position data not corrected by the corrector 140. The absolute position calculated in the absolute position calculator 160 after the processing at Steps S105 and S107 is also referred to as an absolute position before correction, which means that the absolute position has not been corrected. Then, the absolute position before correction that has been calculated is output to the deviation amount measuring unit 230.

After the processing at Steps S105 and S107 (otherwise before the processing or concurrently with the processing), Step S203 will be processed.

At Step S203, the reference absolute position calculator 220 obtains the subordinate data obtained at Step S201 to calculate a true absolute position that serves as a reference without the deviation amount included in the superordinate data based on the subordinate data. The reference absolute position calculator 220 counts, for example, the subordinate section from a predetermined timing to calculate a true absolute position based on the value counted and a position in a section represented by the subordinate data. Then, the true absolute position calculated is output to the deviation amount measuring unit 230. After the processing at step S203, the procedure goes to Step S205.

At Step S 205, the deviation amount measuring unit 230 measures the deviation amount $\Delta p$ based on the absolute position before correction calculated at Step S107 and the true absolute position calculated at Step S203. That is to say, the deviation amount measuring unit 230 measures a difference between the true absolute position and the absolute position before correction to calculate the deviation amount $\Delta p$. The processing at Step S205 will now be described conceptually with reference to FIG. 8. Although in the explanation of the encoder 100 described above, the absolute position Pabs illustrated in FIG. 8 was the absolute position calculated after correction, here it represents the true absolute position. A dashed line in FIG. 8 represents the absolute position before correction in the same manner as the dashed line in FIG. 6 that represented the absolute position before correction including errors, in the explanation of the encoder 100. Therefore, the difference between the true absolute position Pabs and the absolute position before correction represented with the dashed line corresponds to the deviation amount $\Delta p$ that is measured by the deviation amount measuring unit 230. In the example illustrated in FIG. 8, the absolute positions are represented as position data with 16 stages of 0 to 15. Therefore, the absolute position returns to 0 after exceeding 15. This is also applied to the deviation amount $\Delta p$. In the example illustrated in FIG. 8, the deviation amount $\Delta p$ is represented as 4 (the deviation amount $\Delta p$ may take any value from 0 to 15). The deviation amount $\Delta p$ calculated is output to the correction value generating unit 240 and the procedure goes to Step S207.

At Step S207, the correction value generating unit 240 generates the correction value r that can correct the deviation amount $\Delta p$ based on the deviation amount $\Delta p$ measured at Step S205. In the example illustrate in FIG. 8, measurement is performed so that $\Delta p=+4$ as described above. The deviation amount $\Delta p$ is an error in the absolute position, so it is represented with the resolution nearly equal to that of the subordinate data. Therefore, the correction value generating unit 240 divides the deviation amount $\Delta p$ by a multiplying factor m of the subordinate data against the superordinate data (a division number against the superordinate section) to be converted to have the resolution nearly equal to that of the superordinate data. The deviation amount $\Delta p'$ with resolution of the superordinate data, in the example illustrated in FIG. 8, is calculated as $\Delta p'=4/4=1$ because the multiplying factor is 4. Sequentially, the correction value generating unit 240 generates an error r by inverting the symbol of the deviation amount $\Delta p'$ that has been resolution-converted ($r=-\Delta p'=-\Delta p/m$). The error is output to the recording unit 250 and the procedure goes to Step S209.

At Step S209, the recording unit 250 records the error r generated at Step S207 in the storage 130 of the encoder 100 to be associated with an absolute position having lower resolution than that of the subordinate data. For that purpose, the recording unit 250 may obtain an absolute position having lower resolution than subordinate data from inside the encoder 100 or may generate an absolute position from the superordinate data, for example, obtained by the encoder 100. In the embodiment of the present invention, the correction data is associated with the absolute position having resolution nearly equal to that of the superordinate data. Therefore, if the superordinate data is the first position data d1 representing the absolute position, the recording unit 250 will be recorded in the storage 130 to be associated with the superordinate data at the time point when the correction value r was generated. On the other hand, if the superordinate data is the second position data d2 other than the absolute position, the recording unit 250 obtains the medium absolute position data Dmid representing the absolute position nearly equal to that of the superordinate data from the encoder 100, and associates the correction value r with the medium absolute position to be recorded in the storage 130. The procedure goes to Step S 211.

At Step S 211, whether the steps have been processed as described above for all positions in one rotation or not is determined. If they have been processed, operations are completed. If they have not been processed, the procedure goes to Step S213, and after the controlling unit 260 rotates the motor M a predetermined amount, the processing at Step S201 or later will be repeated.

The manufacturing apparatus 200 for the encoder 100 according to the embodiment of the present invention and others have been described. According to the manufacturing apparatus 200, the encoder 100 that can stably measure absolute positions with high resolution as described above can be easily manufactured.

The embodiment of the present invention has been described in detail with reference to accompanying drawings. However, it is to be understood that the present invention is not limited to the examples of the embodiment. It is apparent that those skilled in the art of the present invention can conceive of various changes or modifications of the present invention within the technical ideas described in CLAIMS. Therefore, the technologies after these change or modifications also naturally belong to the technical scope of the present invention.

The steps described in the flowchart herein obviously includes processing performed in chronological order in the order of description, and also includes processing performed concurrently or individually even if it is not processed in chronological order. It is to be understood that the order of steps processed in chronological order can be changed as necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encoder comprising:
 a position data obtainer configured to obtain superordinate data representing a position of a moving body in a superordinate section in which the moving body is capable of moving and subordinate data representing a position of the moving body in a subordinate section repeated in the superordinate section with higher resolution than that of the superordinate data;
 a storage in which a correction value capable of correcting a deviation amount generated in advance, based on the deviation amount occurring in the superordinate data against the subordinate data and measured in advance, is recorded to be associated with an absolute position with lower resolution than that of the subordinate data of the moving body;

a corrector configured to obtain, based on an absolute position with the low resolution when the superordinate data is obtained by the position data obtainer, a correction value associated with the absolute position from the storage and to correct the superordinate data based on the correction value; and a section identifier configured to identify, based on the superordinate data corrected by the corrector and the subordinate data when the superordinate data is obtained, the subordinate section in which the subordinate data is obtained against the superordinate section.

2. The encoder according to claim 1, further comprising an absolute position calculator configured to calculate, based on at least the subordinate section identified by the section identifier and the subordinate data when the superordinate data is obtained, an absolute position with resolution nearly equal to that of the subordinate data of the moving body.

3. The encoder according to claim 2, wherein
the position data obtainer obtains, in each of a plurality of sections obtained by dividing the movable range of the moving body by different division numbers, three or more pieces of position data representing a position of the moving body with different resolutions that become higher when a division number increases;
in the storage, the correction value is recorded for each of a plurality of pairs of two pieces of position data in a relationship of the superordinate data and the subordinate data adjacent to each other in respect to resolution height;
the corrector corrects position data corresponding to the superordinate data based on the correction value for the each of the plurality of pairs;
the section identifier identifies the subordinate section in which the subordinate data is obtained against the superordinate section, based on superordinate data corrected by the corrector and the subordinate data when the superordinate data is obtained, for each of the plurality of pairs; and
the absolute position calculator calculates an absolute position of the moving body with resolution nearly equal to that of position data with the highest resolution, based on all sections identified by the section identifier for each of the plurality of pairs and position data with the highest resolution.

4. The encoder according to claim 3, wherein
in the storage, for superordinate data for each of the plurality of pairs, the correction value is recorded to be associated with an absolute position having resolution nearly equal to that of the superordinate data in the pair; and
the corrector obtains, for each of the plurality of pairs, and based on an absolute position with resolution nearly equal to that of the superordinate data in the pair, the correction value that corrects the superordinate data in the pair.

5. The encoder according to claim 4, wherein
the absolute position calculator calculates, based on a subordinate section identified by the section identifier for at least one of the pairs of two pieces of position data, and subordinate data with the highest resolution out of position data included in the pair in which the subordinate section has already been identified by the section identifier, a medium absolute position with resolution nearly equal to that of the subordinate data; and
the corrector obtains,
if superordinate data included in the pair to be corrected represents an absolute position of the moving body, the correction value that corrects the superordinate data, based on the absolute position represented by the superordinate data;
if superordinate data included in the pair to be corrected does not represent an absolute position of the moving body, the correction value that corrects the superordinate data, based on a medium absolute position that has already been calculated by the absolute position calculator having resolution nearly equal to that of the superordinate data included in the pair to be corrected.

6. The encoder according to claim 1, wherein
the superordinate section is repeated in the movable range of the moving body; and
in the storage, a correction value for superordinate data in a plurality of such superordinate sections adjacent to each other is set to the same value and recorded.

7. A driving apparatus comprising:
a motor configured to move a moving body in a movable range;
a position data obtainer configured to obtain superordinate data representing a position of the moving body in a superordinate section included in the movable range and subordinate data representing a position of the moving body in a subordinate section repeated in the superordinate section with higher resolution than that of the superordinate data;
a storage in which a correction value capable of correcting a deviation amount generated in advance based on the deviation amount occurring in the superordinate data against the subordinate data and measured in advance, is recorded to be associated with an absolute position with lower resolution than that of the subordinate data of the moving body;
a corrector configured to obtain, based on an absolute position with the low resolution when the superordinate data is obtained by the position data obtainer, a correction value associated with the absolute position from the storage and to correct the superordinate data based on the correction value;
a section identifier configured to identify, based on the superordinate data corrected by the corrector and the subordinate data when the superordinate data is obtained, the subordinate section in which the subordinate data is obtained against the superordinate section;
an absolute position calculator configured to calculate, based on at least the subordinate section identified by the section identifier and the subordinate data when the superordinate data is obtained, an absolute position with resolution nearly equal to that of the subordinate data of the moving body; and
a control apparatus configured to control the motor based on the absolute position calculated by the absolute position calculator.

8. A method for calculating an absolute position comprising:
obtaining superordinate data representing a position of a moving body in a superordinate section in which the moving body is capable of moving and subordinate data representing a position of the moving body in a subordinate section repeated in the superordinate section with higher resolution than that of the superordinate data;
obtaining, from a storage in which a correction value capable of correcting a deviation amount generated in advance based on the deviation amount occurring in the superordinate data against the subordinate data and measured in advance, is recorded to be associated with an absolute position with lower resolution than that of the subordinate data of the moving body, and based on the absolute position with lower resolution than that of the subordinate data when the superordinate data is obtained, the correction value associated with the absolute position, and correcting the superordinate data based on the correction value; and identifying, based on the superordinate data corrected and the subordinate data when the superordinate data is obtained, the subordinate section in which the subordinate data is obtained against the superordinate section.

9. A method for manufacturing an encoder comprising:

obtaining superordinate data representing a position of a moving body in a superordinate section in which the moving body is capable of moving and subordinate data representing a position of the moving body in a subordinate section repeated in the superordinate section with higher resolution than that of the superordinate data;

identifying, based on the superordinate data and the subordinate data obtained, the subordinate section in which the subordinate data is obtained against the superordinate section;

calculating, based on at least the subordinate section identified and the subordinate data obtained, an absolute position with resolution nearly equal to that of the subordinate data of the moving body;

calculating a true absolute position of the moving body, based on subordinate data obtained;

measuring, based on the absolute position calculated and the true absolute position calculated, a deviation amount occurring in the superordinate data against the subordinate data;

generating, based on the deviation amount measured, a correction value capable of correcting the deviation amount; and associating the correction value generated with an absolute position with lower resolution than that of the subordinate data of the moving body and recording the correction value in a storage in an encoder.

10. An encoder comprising:

a means for obtaining superordinate data representing a position of a moving body in a superordinate section in which the moving body is capable of moving and subordinate data representing a position of the moving body in a subordinate section repeated in the superordinate section with higher resolution than that of the superordinate data;

a means for storing in which a correction value capable of correcting a deviation amount generated in advance, based on the deviation amount occurring in the superordinate data against the subordinate data and measured in advance, is recorded to be associated with an absolute position with lower resolution than that of the subordinate data of the moving body;

a means for correcting the superordinate data based on a correction value, obtained from the means for storing based on an absolute position with the low resolution when the superordinate data is obtained by the means for obtaining, associated with the absolute position; and a means for identifying, based on the superordinate data corrected by the means for correcting and the subordinate data when the superordinate data is obtained, the subordinate section in which the subordinate data is obtained against the superordinate section.

* * * * *